United States Patent
Cysewski et al.

(10) Patent No.: US 10,882,596 B2
(45) Date of Patent: Jan. 5, 2021

(54) STRUCTURAL FRAME

(71) Applicant: The Boeing Company, Chicago, IL (US)

(72) Inventors: Sean Richard Cysewski, Everett, WA (US); Christopher Veto, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/151,055

(22) Filed: Oct. 3, 2018

(65) Prior Publication Data
US 2020/0108904 A1   Apr. 9, 2020

(51) Int. Cl.
B62C 1/06      (2006.01)
B64C 1/06      (2006.01)
(Continued)

(52) U.S. Cl.
CPC ............ B64C 1/061 (2013.01); E04B 1/2403 (2013.01); E04B 1/28 (2013.01); E04B 1/30 (2013.01); E04B 1/343 (2013.01); E04B 2001/2406 (2013.01); E04B 2001/2436 (2013.01); E04B 2001/2466 (2013.01)

(58) Field of Classification Search
CPC ..... B22F 5/10; B22F 5/12; B31C 1/08; B64C 1/06; B64C 1/061; B64C 1/068; B64C 3/18; B64G 1/22; E04B 1/28; E04B 1/30; E04B 1/343; E04B 1/2403; E04B 2001/2406; E04B 2001/2436; E04B 2001/2466; E04B 1/19; E04B 1/24; E04B 1/585; E04B 1/1903; E04B 1/1906; E04B 1/3211; E04B 2001/1927; E04B 2001/1933; E04B 2001/2415; E04B 2001/2457; E04B 2001/2454; E04B 2001/3294; E04C 3/08;
(Continued)

(56) References Cited

U.S. PATENT DOCUMENTS 1,677,577 A * 7/1928 Amiot ..................... B64C 1/061
                                              296/204
4,247,218 A * 1/1981 Jeannin .................. E04B 1/1903
                                              403/217
(Continued)

OTHER PUBLICATIONS

Co-pending U.S. Appl. No. 15/707,898, filed Sep. 18, 2017.

Primary Examiner — Brian E Glessner
Assistant Examiner — James J Buckle, Jr.
(74) Attorney, Agent, or Firm — McDonnell Boehnen Hulbert & Berghoff LLP

(57) ABSTRACT

In an example, a structural frame is described. The structural frame includes a hub and a plurality of truss members. The hub includes a plurality of hub slots around a perimeter of the hub. The plurality of truss members are configured to couple with the hub and each other. Each truss member is a monolithic structure including: (i) a body extending from a first end of the truss member to a second end of the truss member, (ii) a truss fastener at the first end and configured to couple with a respective one of the plurality of the hub slots of the hub, (iii) a truss slot at the second end and configured to couple to the truss fastener of another one of the plurality of truss members, and (iv) one or more retainers extending along the body between the first end and the second end.

21 Claims, 18 Drawing Sheets

(51) Int. Cl.
  *E04B 1/24* (2006.01)
  *E04B 1/28* (2006.01)
  *E04B 1/343* (2006.01)
  *E04B 1/30* (2006.01)

(58) Field of Classification Search
  CPC ..... E04C 2003/0421; E04C 2003/0491; E04H 12/10; E04H 12/085
  USPC .................. 52/655.1; 135/147, 159; 446/85
  See application file for complete search history.

(56) References Cited

U.S. PATENT DOCUMENTS

| | | | | |
|---|---|---|---|---|
| 4,765,114 | A * | 8/1988 | Wesselski | B64G 9/00 52/646 |
| 5,794,640 | A * | 8/1998 | Jang | E04H 15/50 135/131 |
| 6,675,546 | B2 * | 1/2004 | Coles | F16B 7/185 403/157 |
| 6,860,015 | B2 * | 3/2005 | Muylaert | B64C 27/32 29/898.07 |
| 7,469,514 | B2 * | 12/2008 | Luo | E06B 3/5427 403/157 |
| 7,654,056 | B2 * | 2/2010 | Luo | E06B 3/5427 403/157 |
| 7,694,635 | B2 * | 4/2010 | Bernheimer | A47B 13/02 108/150 |
| 2003/0024203 | A1 * | 2/2003 | Kuo | E04H 12/10 52/646 |
| 2005/0223792 | A1 * | 10/2005 | Pasternack | G01F 1/002 73/170.29 |
| 2005/0241244 | A1 * | 11/2005 | Luo | E06B 3/5427 52/92.2 |
| 2009/0266024 | A1 * | 10/2009 | de la Chevrotiere | E01D 6/00 52/653.1 |
| 2010/0192506 | A1 * | 8/2010 | Allred, III | E04C 3/08 52/655.1 |
| 2010/0200330 | A1 * | 8/2010 | Crookston | E04D 13/174 182/3 |
| 2010/0229482 | A1 * | 9/2010 | Lee | E04B 5/023 52/223.8 |
| 2011/0197378 | A1 * | 8/2011 | De La Chevrotiere | E01D 6/00 14/69.5 |
| 2011/0286121 | A1 * | 11/2011 | Werner | F24S 25/00 359/872 |
| 2013/0187015 | A1 * | 7/2013 | Quintana Rio | B32B 37/0053 248/200 |
| 2014/0331591 | A1 * | 11/2014 | Ohlson | E04B 1/585 52/653.2 |
| 2015/0059263 | A1 * | 3/2015 | Pacaci | E04B 1/24 52/143 |
| 2016/0302366 | A1 * | 10/2016 | Shadowshot | A01G 9/128 |
| 2017/0145694 | A1 * | 5/2017 | Carney | E04B 1/19 |
| 2017/0154150 | A1 * | 6/2017 | Schaefer | B64D 11/0023 |
| 2018/0011965 | A1 * | 1/2018 | Benjamin | B64F 5/00 |
| 2018/0194096 | A1 * | 7/2018 | Martial Somda | B32B 37/12 |
| 2018/0229863 | A1 | 12/2018 | Veto et al. | |
| 2019/0178276 | A1 * | 6/2019 | Hansen | F16B 7/185 |

\* cited by examiner

|  | SEQUENCE | EFFECT |
|---|---|---|
| 1700A → | $S_1: \begin{bmatrix} 1 & 0 \\ 0 & 0 \\ 0 & 1 \end{bmatrix} \left( \begin{bmatrix} a & b \\ 0 & 0 \\ c & d \end{bmatrix}^T \begin{bmatrix} 0 & 1 \\ 0 & 0 \\ 1 & 0 \end{bmatrix} \right) = \begin{bmatrix} c & a \\ 0 & 0 \\ d & b \end{bmatrix}$ | L/R FLIP |
| 1700B → | $S_2: \begin{bmatrix} a & b \\ 0 & 0 \\ c & d \end{bmatrix} \begin{bmatrix} 0 & 1 \\ 1 & 0 \end{bmatrix} = \begin{bmatrix} b & a \\ 0 & 0 \\ d & c \end{bmatrix}$ | U/D FLIP |
| 1700C → | $S_3: \begin{bmatrix} 0 & 0 & 1 \\ 0 & 1 & 0 \\ 1 & 0 & 0 \end{bmatrix} \begin{bmatrix} a & b \\ 0 & 0 \\ c & d \end{bmatrix} = \begin{bmatrix} c & d \\ 0 & 0 \\ a & b \end{bmatrix}$ | CLOCKWISE ROATION |
| 1700D → | $S_4: \begin{bmatrix} 1 & 2 & 3 \\ 4 & 5 & 6 \\ 7 & 8 & 9 \end{bmatrix} \begin{bmatrix} 0 & 0 & 1 \\ 0 & 1 & 0 \\ 1 & 0 & 0 \end{bmatrix} = \begin{bmatrix} 3 & 2 & 1 \\ 6 & 5 & 4 \\ 9 & 8 & 7 \end{bmatrix}$ | L/R FLIP |
| 1700E → | $S_5: \begin{bmatrix} 0 & 0 & 1 \\ 0 & 1 & 0 \\ 1 & 0 & 0 \end{bmatrix} \begin{bmatrix} 1 & 2 & 3 \\ 4 & 5 & 6 \\ 7 & 8 & 9 \end{bmatrix} = \begin{bmatrix} 7 & 8 & 9 \\ 4 & 5 & 6 \\ 1 & 2 & 3 \end{bmatrix}$ | U/D FLIP |
| 1700F → | $S_6: \begin{bmatrix} 1 & 2 & 3 \\ 4 & 5 & 6 \\ 7 & 8 & 9 \end{bmatrix}^T \begin{bmatrix} 0 & 0 & 1 \\ 0 & 1 & 0 \\ 1 & 0 & 0 \end{bmatrix} = \begin{bmatrix} 7 & 4 & 1 \\ 8 & 5 & 2 \\ 9 & 6 & 3 \end{bmatrix}$ | CLOCKWISE ROATION |
| 1700G → | $S_7: \begin{bmatrix} 1 & 2 & 3 \\ 4 & 5 & 6 \\ 7 & 8 & 9 \end{bmatrix} \begin{bmatrix} 0 & 1 & 0 \\ 0 & 0 & 1 \\ 1 & 0 & 0 \end{bmatrix} = \begin{bmatrix} 3 & 1 & 2 \\ 6 & 4 & 5 \\ 9 & 7 & 8 \end{bmatrix}$ | 5$^{th}$ ELEMENT DISPLACEMENT |

*Fig. 17*

STRUCTURAL FRAME

FIELD

The present disclosure generally relates to structural frames, and more specifically to a structural frame including a plurality of interconnectable, monolithic truss members.

BACKGROUND

In various applications, it may be useful to provide a structural frame to mechanically support one or more loads in a system. For instance, in an aircraft, a fuselage can include one or more stringers and/or frame members that are mechanically coupled to a fuselage skin (e.g., via rivets) and/or each other. Additionally, for instance, a structural frame may be used in an aircraft to couple a strong-back and storage bin to the fuselage.

SUMMARY

In an example, a structural frame is described. The structural frame includes a hub and a plurality of truss members. The hub includes a plurality of hub slots around a perimeter of the hub. The plurality of truss members are configured to couple with the hub and each other. Each truss member is a monolithic structure including: (i) a body extending from a first end of the truss member to a second end of the truss member, (ii) a truss fastener at the first end and configured to couple with a respective one of the plurality of the hub slots of the hub, (iii) a truss slot at the second end and configured to couple to the truss fastener of another one of the plurality of truss members, and (iv) one or more retainers extending along the body between the first end and the second end.

In another example, a structural frame is described. The structural frame includes a hub and a plurality of truss members. The hub includes a plurality of hub slots around a perimeter of the hub. The plurality of truss members are coupled to the hub. Each truss member is a monolithic structure including: (i) a body extending from a first end of the truss member to a second end of the truss member, (ii) a truss fastener at the first end and coupled with a respective one of the plurality of the hub slots of the hub, and (iii) one or more retainers extending along the body between the first end and the second end. The structural frame also includes a plurality of optical fibers coupled to the one or more retainers of the plurality of truss members.

In another example, a structural frame is described. The structural frame includes a first truss member and a second truss member. The first truss member includes: (i) a first body extending from a first end of the first truss member to a second end of the first truss member, (ii) a truss slot at the second end of the first truss member, and (iii) a first retainer extending along the first body between the first end and the second end of the first truss member. The first truss member is a monolithic structure.

The second truss member is coupled to the first truss member. The second truss member includes: (a) a second body extending from a first end of the second truss member to a second end of the second truss member, (b) a truss fastener at the first end of the second truss member and coupled to the truss slot of the first truss member, and (c) a second retainer extending along the second body between the first end and the second end of the second truss member. The second truss member is a monolithic structure.

The structural frame also includes an optical fiber coupled to the first retainer of the first truss member and the second retainer of the second truss member. The structural member further includes a fiber optic sensing system (FOSS) configured to sense light reflected in the optical fiber and determine, based on the light, a physical condition of the first truss member and the second truss member.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 17 illustrates example transforms that can be performed by a processor to determine a physical condition of a truss member, according to an example embodiment.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

By the term "approximately" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As noted above, it may be useful to provide a structural frame to mechanically support one or more loads in a system. For instance, a number of components of an aircraft are coupled to a fuselage by multiple joints that are relatively heavy and relatively weak. For example, in existing aircraft, a storage bin is typically coupled to a strongback, which is coupled to a frame, which is coupled to tierods, which are coupled to an aircraft fuselage. Each joint between each of these components is a weak point in the system that may require extra material to improve performance. However, the weight of the structural frame can affect the performance, efficiency, and/or efficacy of a system. For instance, on an aircraft, the weight of the structural frame can negatively affect the fuel efficiency and/or a range of flight of the aircraft.

Additionally, for example, conventional structural frames generally provide for relatively little movement and/or flexure between components of the structural frames. As such, conventional structural frames may form hard point loading conditions that may be difficult to detect. Further, in some scenarios, it can be challenging to optimize a design of a conventional structural frame for specific loads that are likely to be experienced by the structural frames due to the relatively large number joints that are required to create a complex structural frame design.

Example systems and methods described herein can address at least some drawbacks of existing structural frames.

Figure 1A:
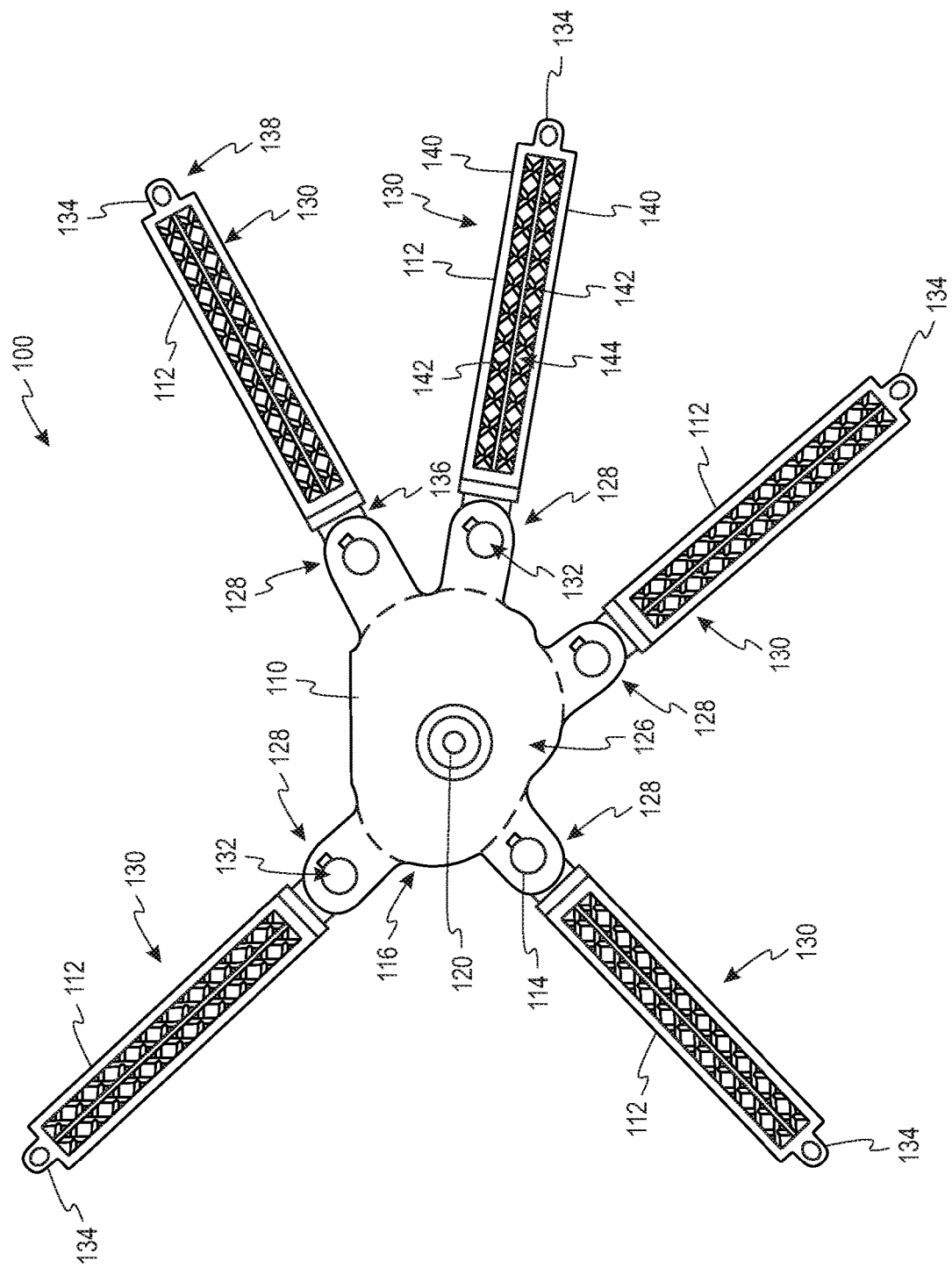
FIG. 1A illustrates a side view of the structural frame, according to an example embodiment.
Figure 1B:
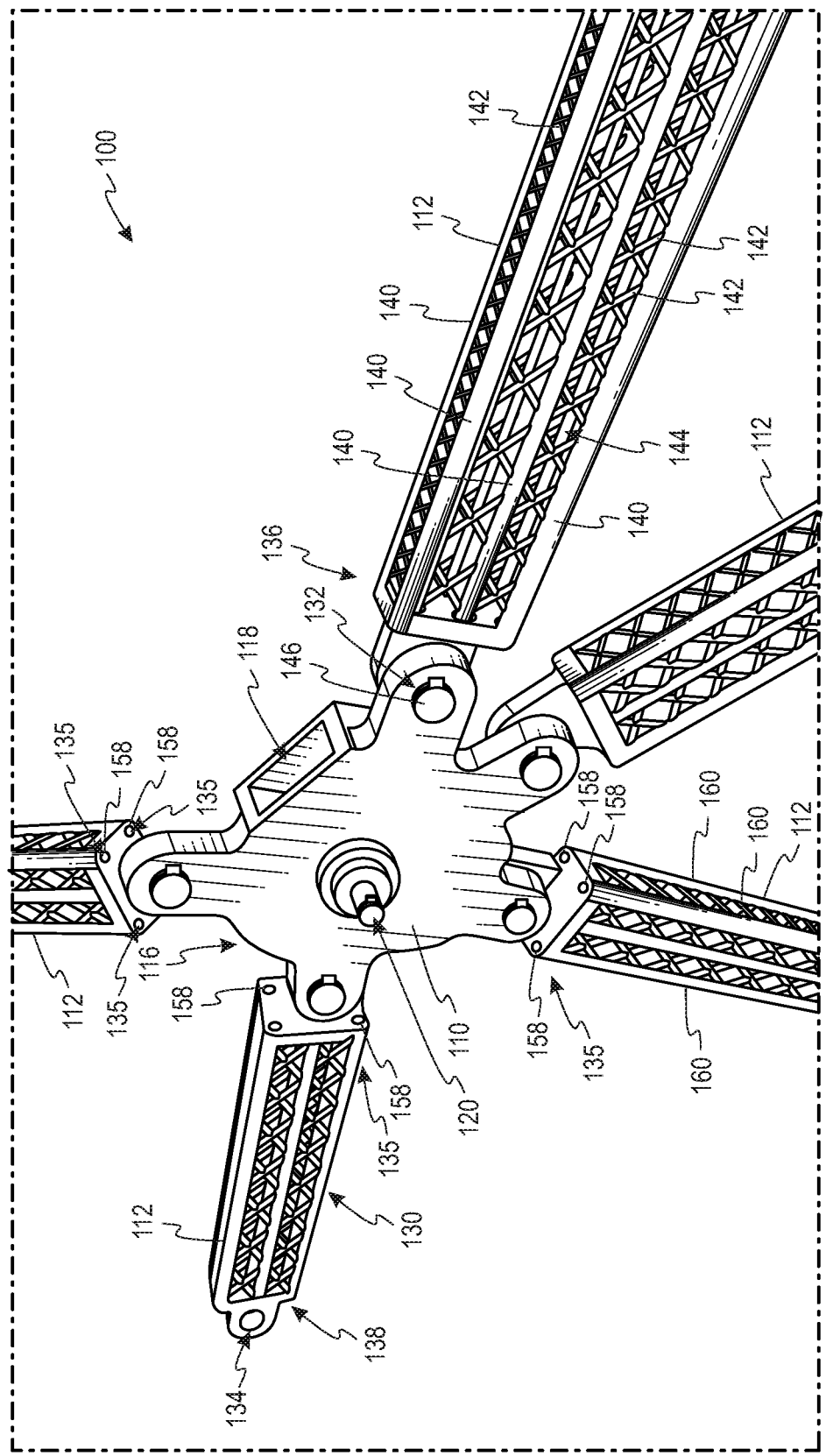
FIG. 1B illustrates a partial perspective view of the structural frame shown in FIG. 1A, according to an example embodiment.
Figure 1C:
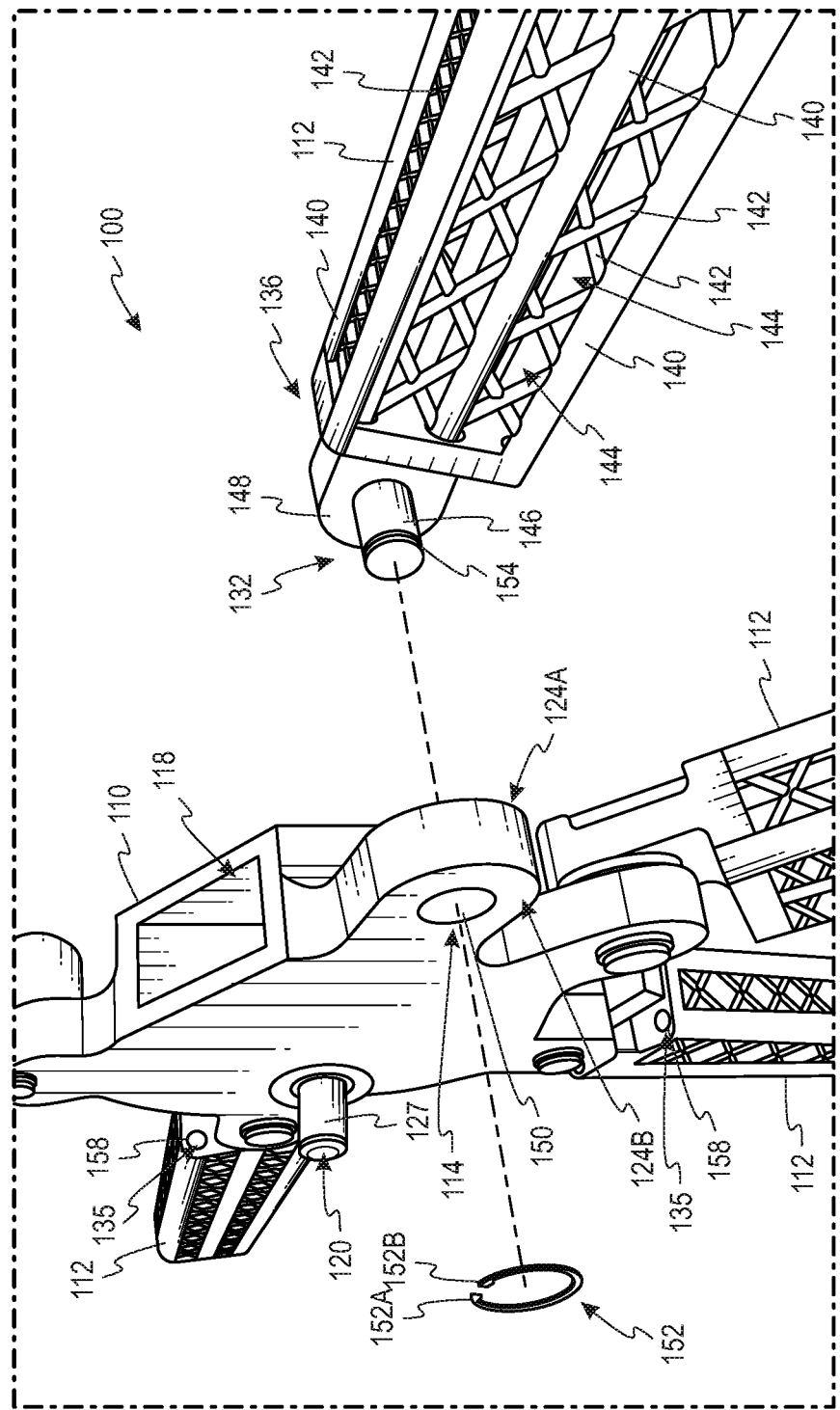
FIG. 1C illustrates a partially exploded view of the structural frame shown in FIGS. 1A-1B, according to the example embodiment.

Referring now to FIGS. 1A-1C, a structural frame 100 is depicted according to an example embodiment. More specifically, FIG. 1A depicts a side view of the structural frame 100, FIG. 1B depicts a partial perspective view of the structural frame 100, and FIG. 1C depicts a partially exploded view of the structural frame 100 according to the example embodiment.

As shown in FIGS. 1A-1C, the structural frame 100 includes a hub 110 and a truss member 112. The structural frame 100 can comprise a plurality of truss members 112. Within the examples, the hub 110 and each truss member 112 is a respective monolithic structure. As such, the hub 110 is integrally formed as a single, one-part structure and each truss member 112 is integrally formed as a respective single, one-part structure. By providing the hub 110 and the truss members 112 as respective monolithic structures, the structural frame 100 can have fewer weak points than other structural frames in which a plurality of separate and distinct sub-components are joined (e.g., via welding and/or brazing) to form a hub and/or a truss member. Additionally, as described further below, providing the hub 110 and the truss members 112 as respective monolithic structures can assist in reducing a weight of the structural frame 100 and/or assist in efficiently forming relatively complex structural frame designs.

In one example, the hub 110 and/or the truss members 112 can be formed by an additive manufacturing process such as, for instance, a three-dimensional (3D) printing process. For instance, the hub 110 and/or the truss members 112 can be formed by laying down a plurality of successive layers of material. Additionally, for example, the hub 110 and/or the truss members 112 can be formed by VAT photopolymerization, powder bed fusion, binder jetting, bronze infusion/infiltration, material jetting, sheet lamination, material extrusion, directed energy deposition, directed metal laser sintering, direct metal printing, electron beam additive manufacturing, electron beam melting, electron beam powder bed, fused deposition modeling, indirect power bed, laser cladding technology, laser deposition technology, laser deposition welding, laser deposition welding with integrated milling, laser engineering net shape, laser freeform manufacturing technology, laser metal deposition-powder, laser metal deposition-wire, laser powder bed, laser puddle deposition, laser repair technology, powder directed energy deposition, stereolithography, selective laser melting, selective laser sintering, small puddle deposition, atomic diffusion additive manufacturing, big area additive manufacturing, bound metal deposition, composite-based additive manufacturing, digital light processing, digital light synthesis, gel dispensing printing, high-speed sintering, laminated object manufacturing, multi-jet fusion, Quantum & Nano-pico-femto-atto-scale Manufacturing (QUN), rapid plasma deposition, selective deposition lamination, single-pass jetting, ultrasonic additive manufacturing, Ytterbium In-situ Manufacturing (YIM), and/or other mechanical adding machines and vivat-crescat-floreat, ad infinitum, hybrid processes thereof.

In another example, the hub 110 and/or the truss members 112 can be additionally or alternatively formed using a subtractive manufacturing process. For instance, a cutting process, a milling process, a drilling process, and/or an ablation process can be implemented to remove controlled amounts from a raw material to form the hub 110 and/or the truss members 112. In another example, the hub 110 and/or the truss members 112 can be additionally or alternatively formed by an extrusion process and/or a pultrusion process.

As examples, the hub 110 and/or the truss members 112 can be formed from one or more metals such as steel, stainless steel, titanium, copper, aluminum, nickel, and alloys thereof (e.g., IN625, IN718, Incaloy 909, Invar 36, Ti-6Al-4V, AlSi10Mg, SS316, Monel, Monel K500, Copper, Ti-5553, Ti-6Al-6V-2Sn, Ti-6242, Maraging Steel MSI 18, Mar 300, 316L, 17-4, 15-4, Cobalt Chrome SP2, Ti-6Al-4V ELI, Nickel Alloy HX, gold (Au), silver (Ag)). In other examples, the hub 110 and/or the truss members 112 can be additionally or alternatively formed from one or more polymers such as Acrylonitile Butadiene Styrene (ABS), Polylactic acid (PLA), Polyvinyl alcohol, and Polycarbonate, and others including ULTEM, ULTEM 1010, ULTEM 9085, Kel-F, Kevlar, Nylon, and Carbon Composite, Polyamide (PA), Polyphenylene Sulfide (PPS), Polyether Ether Ketone (PEEK), Poly-Ether-Ketone-Ketone (PEKK), Polyetherimide (PEI), Polysulfone (PSU) Polyphenylsulfone (PPSU), Polyethersulfone (PES/PESU), Thermoplastic Polyimide (TPI), Liquid Crystalline Polymer (LCP), polyamide-imide (PAI), Nylon, Nylon 11, Nylon 12, acrylonitrile butadiene styrene, polyactic acid, polyetherimide (ULTEM), carbon fiber, para-aramid synthetic fibers (KEVLAR), polychlorotrifluoroethylene, polytetrafluoroethylene (TEFLON), and/or polyethyleneterephthalate. Additionally or alternatively, hub 110 and/or the truss members 112 can be formed from a non-thermoplastic material (e.g., an epoxy).

The material used to form the hub 110 and/or the truss members 112 can additionally include a support material such as, for example, polyvinyl acetate (PVA), water-soluble crystals and other melt-aways (e.g., Cu, Ag, Al, Sb, Zn and/or Sn), alloys such as solder and/or a low-melting point Ag alloy solder (e.g., Ag—Sn—Pb, Ag—Pb, Ag—Sn, Ag—Sn—Cu, Ag—Cd—Zn, and/or Ag—Cd), polyethylene, polyamide, polyimide, polyprophylene, PMMA, polyether sulfone, thermoplasticpolyester, copolymer or polyhexafluoropropylene and polytetrafluoroethylene, polyfluorovinylidene, and/or other organic composite photoresist materials (e.g., a dry film type resist).

In one example, the hub 110 and/or the truss members 112 may be formed by altering a blending of deposited additively manufactured materials such that Functionally Gradient Material (FGM) properties can be achieved, including varying the Coefficient of Thermal Expansion (CTE). In another example, the hub 110 and/or the truss members 112 can be formed from a powder (e.g., collected waste powder or produced powder from an Electrical Discharge Machining (EDM) process). In another example, the hub 110 and/or the truss members 112 may be constructed of flexible material for purposes of resiliency to high-vibration regimes, flexure in aeroelastic applications.

As shown in FIGS. 1A-1C, the hub 110 includes a plurality of hub slots 114 around a perimeter 116 of the hub 110. As described in further detail below, the hub slots 114 are suitable for coupling the hub 110 to the truss members 112. By providing the plurality of hub slots 114 around the perimeter 116, the hub 110 can support a plurality of different directional loads applied to the hub 110 by the truss members 112. In FIGS. 1A-1C, the hub 110 includes five hub slots 114. However, the hub 110 can include a different quantity of hub slots 114 around the perimeter 116 in other example embodiments (e.g., two hub slots 114, three hub slots 114, four hub slots 114, six hub slots 114, seven hub slots 114, eight hub slots 114, etc.).

As shown in FIGS. 1B-1C, the hub 110 can be a hollow, monolithic structure including a cavity 118. By providing the cavity 118 in the hub 110, the hub 110 can be made from less material than a similarly sized hub that is solid throughout the hub 110. Thus, by providing the cavity 118 in the hub 110, the hub 110 can have a reduced weight, which may result in more efficient operation of a system (e.g., a vehicle) including the structural frame 100. For instance, the relatively light weight of the hub 110 can help to increase the fuel-efficiency of an aircraft relative to conventional structural frames. Additionally, for example, reducing the amount of material used to form the hub 110 can help to reduce a cost and/or schedule to manufacture the hub 110. However, in other examples, the hub 110 is cavity-less 118 (i.e., the hub 110 can omit the cavity and instead be solid throughout).

In some examples, the hub 110 can also include a hub fastener 120 that can couple the hub 110 to another structure. For instance, in an implementation in which the structural frame 100 is a part of an aircraft, the hub fastener 120 can couple the hub 110 to a bulkhead, a strong-back, a rib, a spar, a landing gear assembly, a step-ladder, and/or a storage bin of the aircraft. As an example, in FIGS. 1A-1C, the hub fastener 120 can include a protrusion that extends outwardly away from the hub 110. As will be described in further detail below, the hub fastener 120 can be received by a fastener-retention feature on the structure to which the hub 110 is coupled.

In FIGS. 1A-1C, the hub 110 includes a central portion 126 and a plurality of lobes 128 extending outwardly from the central portion 126. Each of the lobes 128 includes a respective one of the hub slots 114, whereas the central portion 126 includes the hub fastener 120. Within examples, a size and/or a shape of the central portion 126 relative to a size and/or a shape of the lobes 128 can be based on one or more forces that may be expected to be applied to the hub 110 by the truss members 112 coupled to the hub slots 114 of the hub 110. For instance, the size and/or the shape of the central portion 126 relative to the size and/or shape of the lobes 128 can be configured to reduce (or minimize) plastic deformation of the hub 110 (i.e., irreversible deformation of the hub 110) responsive to forces applied to the hub 110 by the truss members 112.

Providing the hub slots 114 in the lobes 128 of the hub 110 can also assist in reducing (or minimizing) an amount of material for forming the hub 110 and, thus, provide one or more of the benefits described above. However, the hub 110 can omit one or more of the lobes 128 and instead include one or more hub slots 114 in the central portion 126 in other example embodiments. In FIGS. 1A-1C, the hub 110 has an asymmetric shape. An asymmetric shape may help the hub 110 support a plurality of different loads applied in a plurality of different directions (e.g., omni-directionally) by the truss members 112. However, in other examples, the hub 110 can have a symmetric shape. This may be beneficial in implementations in which the loads applied by truss members 112 to the hub 110 are more evenly distributed around the perimeter 116 of the hub 110.

As noted above, each truss member 112 is also a monolithic structure. In FIGS. 1A-1C, the monolithic structure of each truss member 112 includes a body 130, a truss fastener 132, a truss slot 134, and one or more retainers 135. The body 130 extends from a first end 136 of the truss member 112 to a second end 138 of the truss member 112. In FIGS. 1A-1C, each truss member 112 is a linear structure extending in a straight line between the first end 136 and the second end 138. However, as described below with respect to FIG. 10, one or more of the truss members 112 can be a non-linear structure that includes one or more bends and/or arcs in other example embodiments. A non-linear structure may be beneficial, for example, in an implementation in which at least a portion of the structural frame 100 is routed around other structures in an environment.

In FIGS. 1A-1C, for each truss member 112, the body 130 of the truss member 112 can include a plurality of longitudinal portions 140 extending from the first end 136 to the second end 138, and a plurality of transverse portions 142 extending between the plurality of longitudinal portions 140. Additionally, as shown in FIGS. 1A-1C, the longitudinal portions 140 and the transverse portions 142 define a plurality of apertures 144 in the body 130 between the first end 136 and the second end 138. By forming the body 130 with one or more apertures 144, the truss member 112 can be made from less material than a similarly sized truss member 112 that is solid throughout the truss member 112. Thus, by providing the aperture(s) 144 in the body 130, the truss member 112 can have a reduced weight, which may result in more efficient operation and/or performance of a system (e.g., a vehicle) including the structural frame 100. Additionally, for example, reducing an amount of material of the truss member 112 can result in a reduced cost and/or schedule to manufacture the truss member 112.

As shown in FIGS. 1A-1C, the transverse portions 142 can include a plurality of pairs of struts that are perpendicular (i.e., orthogonal) to each other and extend between adjacent ones of the longitudinal portions 140 of the body 130. The arrangement of perpendicular struts can assist in increasing (or maximizing) a strain resistance per mass ratio of the truss member 112. Thus, this arrangement of transverse portions 142 and/or longitudinal portions 140 can help to reduce the amount of material and/or weight of the truss member 112 for achieving at least a minimum strain resistance capability of the truss member 112.

Although there may be benefits to the truss members 112 having the longitudinal portions 140, the transverse portions 142, and the apertures 144, the body 130 of one or more of the truss members 112 can be arranged differently in other examples. For instance, in another example, the body 130 of one or more truss members 112 can be solid throughout (i.e., omit the apertures 144) a portion and/or an entirety of the truss member(s) 112 between the first end 136 and the second end 138. Additionally, for instance, the body 130 of one or more of the truss members 112 can include a greater or a lesser quantity of the longitudinal portions 140 and/or the transverse portions 142 arranged in a similar configuration to that shown in FIGS. 1A-1C and/or a different configuration in other examples.

For each truss member 112, the truss fastener 132 is at the first end 136 and configured to couple with a respective one of the plurality of the hub slots 114 of the hub 110. For example, as shown in FIG. 1C, the truss fastener 132 can include a protrusion 146 that extends from a lateral surface 148 in a direction, which is transverse to a longitudinal axis of the truss member 112 (i.e., transverse to an axis extending between the first end 136 and the second end 138). Additionally, for example, each hub slot 114 can include an aperture 150 that extends from a first side 124A of the hub 110 to a second side 124B of the hub 110. The protrusions 146 of the truss fasteners 132 and the apertures 150 of the hub slots 114 can have respective sizes and shapes such that the protrusions 146 of the truss fasteners 132 can be received in the apertures 150 of the hub slots 114 to couple the truss members 112 to the hub 110.

In some examples, the structural frame 100 can include a plurality of retaining rings 152 to axially retain the truss fasteners 132 in the respective hub slots 114. For instance, in FIGS. 1A-1C, the truss members 112 are coupled to the hub 110 by the retaining rings 152. In one implementation, each retaining ring 152 can have an outer circumference that is greater than an outer circumference of each hub slot 114. Additionally, for each truss member 112, the truss fastener 132 can include a notch 154 that can receive a respective one of the retaining rings 152. In this arrangement, for each truss member 112: (i) the truss fastener 132 can extend, from the first side 124A of the hub 110 to a second side 124B of the hub 110, through a respective hub slot 114 of the plurality of hub slots 114, and (ii) a respective retaining ring 152 of the plurality of retaining rings 152 can be coupled to the notch 154 of the truss fastener 132 on the second side 124B of the hub 110 such that the respective retaining ring 152 inhibits withdrawal of the truss fastener 132 from the respective hub slot 114.

To couple the respective retaining ring 152 to the notch 154 of the truss fastener 132, the retaining ring 152 can have an inner circumference that is greater than a circumference of the notch 154 and less than a circumference of the protrusion 146 adjacent to the notch 154. As such, when the retaining ring 152 is coupled to the notch 154 of the truss fastener 132, axial movement of the retaining ring 152 relative to the truss fastener 132 (i.e., movement in a direction parallel to a longitudinal axis of the protrusion 146) is limited by an engagement between the retaining ring 152 and lateral sides of the notch 154.

As noted above, the outer circumference of each retaining ring 152 can be greater than the circumference of each hub slot 114. The outer circumference of each retaining ring 152 can also be greater than the circumference of each protrusion 146 such that an outer portion of the retaining ring 152 extends outwardly in a radial direction from the protrusion 146 (i.e., a direction transverse to the longitudinal axis of the protrusion 146). In this arrangement, the outer portion of the retaining ring 152 can provide a stop structure, which limits axial movement of the truss fastener 132 relative to the hub slot 114 due to (i) the retaining ring 152 being axially retained in the notch 154 of the truss fastener 132, and (ii) the outer circumference of the retaining ring 152 (which is radially outward of the protrusion 146) being greater than the circumference of the hub slot 114.

In some examples, the notch 154 can be at a distance from the lateral surface 148 that approximately corresponds to a distance between the first side 124A of the hub 110 and the second side 124B of the hub 110. This can help to reduce (or minimize) play between the truss member 112 and the hub 110 when coupled to each other. In other examples, the notch 154 can be at a farther distance from the lateral surface 148 to provide some play between the truss member 112 and the hub 110, and/or to provide space to accommodate another component (e.g., a bearing as described further below and/or a washer) between the truss member 112 and the hub 110.

In some examples, the retaining rings 152 can provide for removable coupling between the truss members 112 and the hub 110. For instance, as shown in FIG. 1C, each retaining ring 152 can be a robust, ring-shaped spring clip extending between a first free end 152A and a second free end 152B. To couple the retaining ring 152 to one of the truss fasteners 132, a force can be applied to the first free end 152A and the second free end 152B to move the first free end 152A and the second free end 152B apart from each other and expand a size of the retaining ring 152 to a size that is greater than a diameter of the notch 154. While the size of the retaining ring 152 is expanded, the retaining ring 152 can be positioned around the notch 154 of the truss fastener 132. After the retaining ring 152 is positioned around the notch 154, the force applied to the first free end 152A and the second free end 152B can be removed to allow the first free end 152A and the second free end 152B to move toward each other and thereby reduce the size of the retaining ring 152.

To remove the retaining ring 152 from the truss fastener 132, the force can again be applied to the first free end 152A and the second free end 152B to move the first free end 152A and the second free end 152B apart from each other and expand the size of the retaining ring 152 to a size that is greater than the diameter of the notch 154. While the size of the retaining ring 152 is expanded, the retaining ring 152 can be removed from the notch 154 of the truss fastener 132.

Removably coupling the truss members 112 to the hub 110 (e.g., by the retaining rings 152) can facilitate performing maintenance and repair operations on the structural frame 100 in a convenient and efficient manner. For instance, if a particular truss member 112 experiences a relatively high strain and/or exhibits signs of heavy use, the particular truss member 112 can be easily decoupled from the hub 110 and replaced by a new truss member 112.

As noted above, each truss member 112 also includes the truss slot 134. As shown in FIGS. 1A-1C, for each truss member 112, the truss slot 134 is at the second end 138 and configured to couple to the truss fastener 132 of another one of the plurality of truss members 112. Within examples, the truss slots 134 can be similar to the hub slots 114 (e.g., with an aperture that can receive the truss fastener 132 of another truss member 112). Accordingly, in this arrangement, the truss members 112 are configured to couple with the hub 110 and each other. This can allow for the truss members 112 to operate as a basic building block (e.g., a basic unit) from which a wide variety of differently shaped and/or sized structural frames 100 can be formed. Additionally, providing a common arrangement for coupling the truss members 112 with the hub 110 and each other can facilitate more efficient assembly, maintenance, and/or repair of the structural frame 100.

Figure 2A:
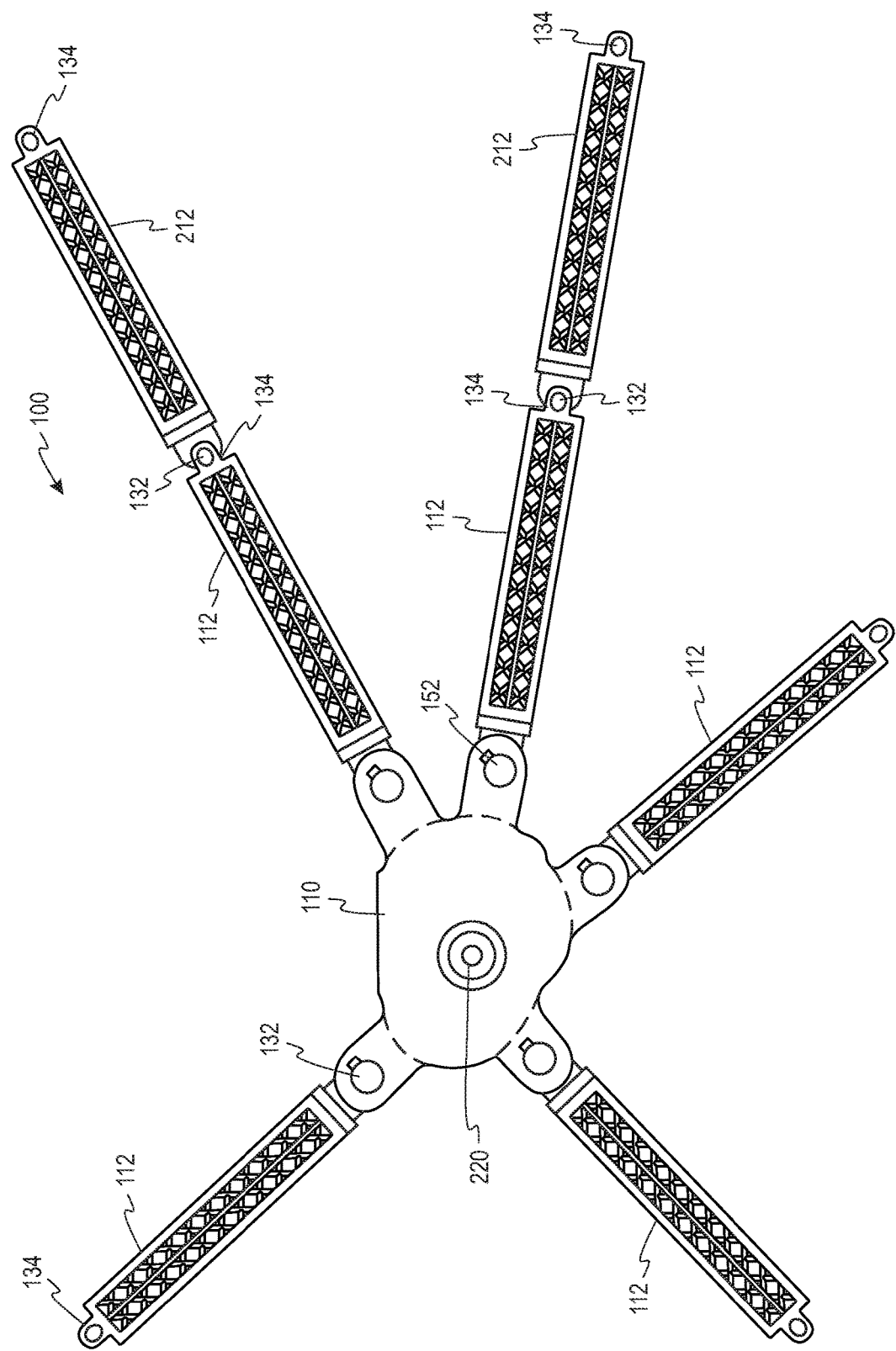
FIG. 2A illustrates a side view of the structural frame, according to another example embodiment.
Figure 2B:
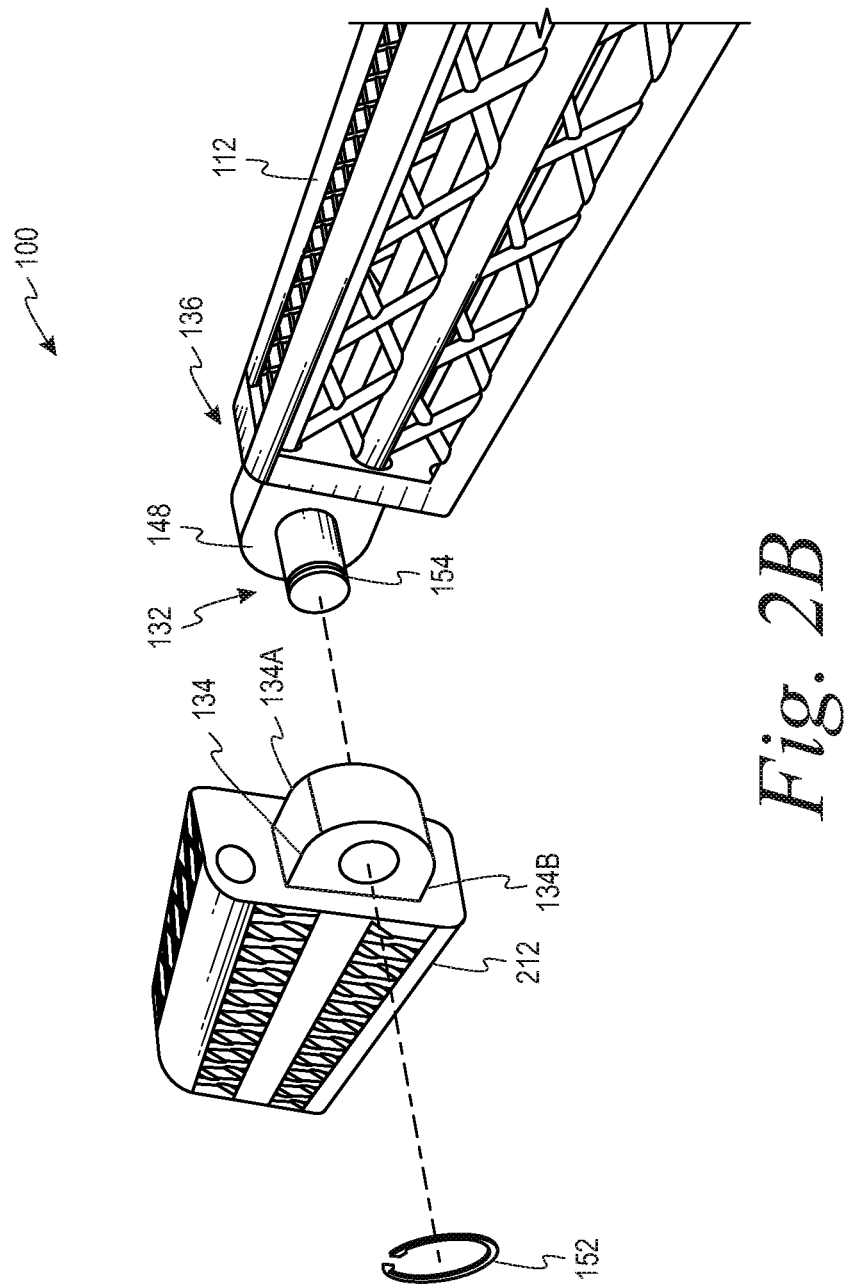
FIG. 2B illustrates a partially exploded view of the structural frame shown in FIG. 2A, according to the example embodiment.

As an example, FIGS. 2A-2B depict the structural frame 100 with additional truss members 212 coupled to two of the truss members 112 shown in FIGS. 1A-1C. In this example, the additional truss members 212 are substantially similar or identical to the truss members 112 described with respect to FIGS. 1A-1C. As such, each truss member 112, 212 includes, for example, a body 130, a truss fastener 132, and a truss slot 134 as described above.

In FIG. 2A, the truss members 112, 212 can include a first set of truss members 112 that is coupled to the hub 110, and a second set of truss members 212 that is coupled to two truss members 112 of the first set of truss members 112. For example, in FIG. 2A, the first set of the plurality of truss members 112 is coupled to the hub 110 by the plurality of retaining rings 152 as described above and as shown in FIGS. 1B-1C. As such, for each truss member 112 of the first set: (i) the truss fastener 132 extends, from the first side 124A of the hub 110 to the second side 124B of the hub 110, through a respective hub slot 114 of the plurality of hub slots 114, (ii) the truss fastener 132 includes the notch 154 on the second side 124B of the hub 110, and (iii) a respective retaining ring 152 of the plurality of retaining rings 152 is coupled to the notch 154 of the truss fastener 132 on the second side 124B of the hub 110 such that the respective retaining ring 152 inhibits withdrawal of the truss fastener 132 from the respective hub slot 114.

Additionally, in FIG. 2A, the second set of the plurality of truss members 212 is coupled to two truss members 112 of the first set of truss members 112 by respective ones of the retaining rings 152. For instance, as shown in FIG. 2B, for each truss member 212 of the second set: (i) the truss fastener 132 extends through the truss slot 134 from a first side 134A of the truss slot 134 to a second side 134B of the truss slot 134, (ii) the truss fastener 132 includes the notch 154 on the second side 134B of the truss slot 134, and (iii) a respective retaining ring 152 of the plurality of retaining rings 152 is coupled to the notch 154 of the truss fastener 132 on the second side 134B of the truss slot 134 such that the respective retaining ring 152 inhibits withdrawal of the truss fastener 132 from the truss slot 134.

As shown in FIGS. 1A-2B, for each of the truss member 112, 212, the one or more retainers 135 extend along the body 130 between the first end 136 and the second end 138 of the body 130. As used herein, the phrase "extending along the body" means extending through an interior of the body 130 and/or extending on an exterior surface of the body 130. In general, the retainer(s) 135 are configured to retain an elongated structure extending along the body 130 of the truss member 112, 212. The elongated structure can include one or more components of a system in which the structural frame 100 is integrated. For instance, as examples, the elongated structure can include an optical fiber, a hydraulic fluid line, a mass-flow line, a feed-stock line, a fuel line, a cable, and/or a heat exchanger tube.

Conventionally, such elongated structures are loosely hung from structural frames, coupled to structural frames by separate components (e.g., fasteners, adhesives, zip ties), and/or supported by other structures (e.g., supported on a floor surface). By integrating the retainer(s) 135 as a part of the monolithic structure of the truss members 112, the elongated structures can beneficially be routed through an environment in a more space-efficient, tidier, and/or less labor-intensive manner than conventional approaches. Accordingly, the structural frame 100 including the retainer(s) 135 can beneficially (i) provide a framework for supporting one or more structural loads and/or (ii) provide a framework for routing one or more components of an operational system.

In FIGS. 1A-2B, for each truss member 112, 212, the one or more retainers 135 include a plurality of conduits 158 extending through the body 130 of the truss member 112, 212 from the first end 136 to the second end 138. For instance, in FIGS. 1A-2B, each conduit 158 extends through a respective one of the longitudinal portions 140 of the truss members 112, 212. Additionally, in FIGS. 1A-2B, each truss member 112, 212 has a cross-sectional shape that includes four corners 160 and, for each truss member 112, 212, a respective one of the plurality of conduits 158 is at each corner 160 of the truss member 112, 212. However, in other examples, the conduits 158 can be provided in a different quantity of corners 160 and/or in the longitudinal portions 140 that are not at the corners 160. For instance, in one implementation, each truss member 112, 212 can have a cross-sectional shape that includes at least three corners 160 and, for each truss member 112, 212, a respective one of the plurality of conduits 158 is at each corner 160 of the truss member 112, 212. In another implementation, each truss member 112, 212 can have a cross-sectional shape that includes at least three vertices and, for each truss member 112, 212, a respective one of the plurality of conduits 158 is at each vertex of the truss member 112, 212.

Figure 3:
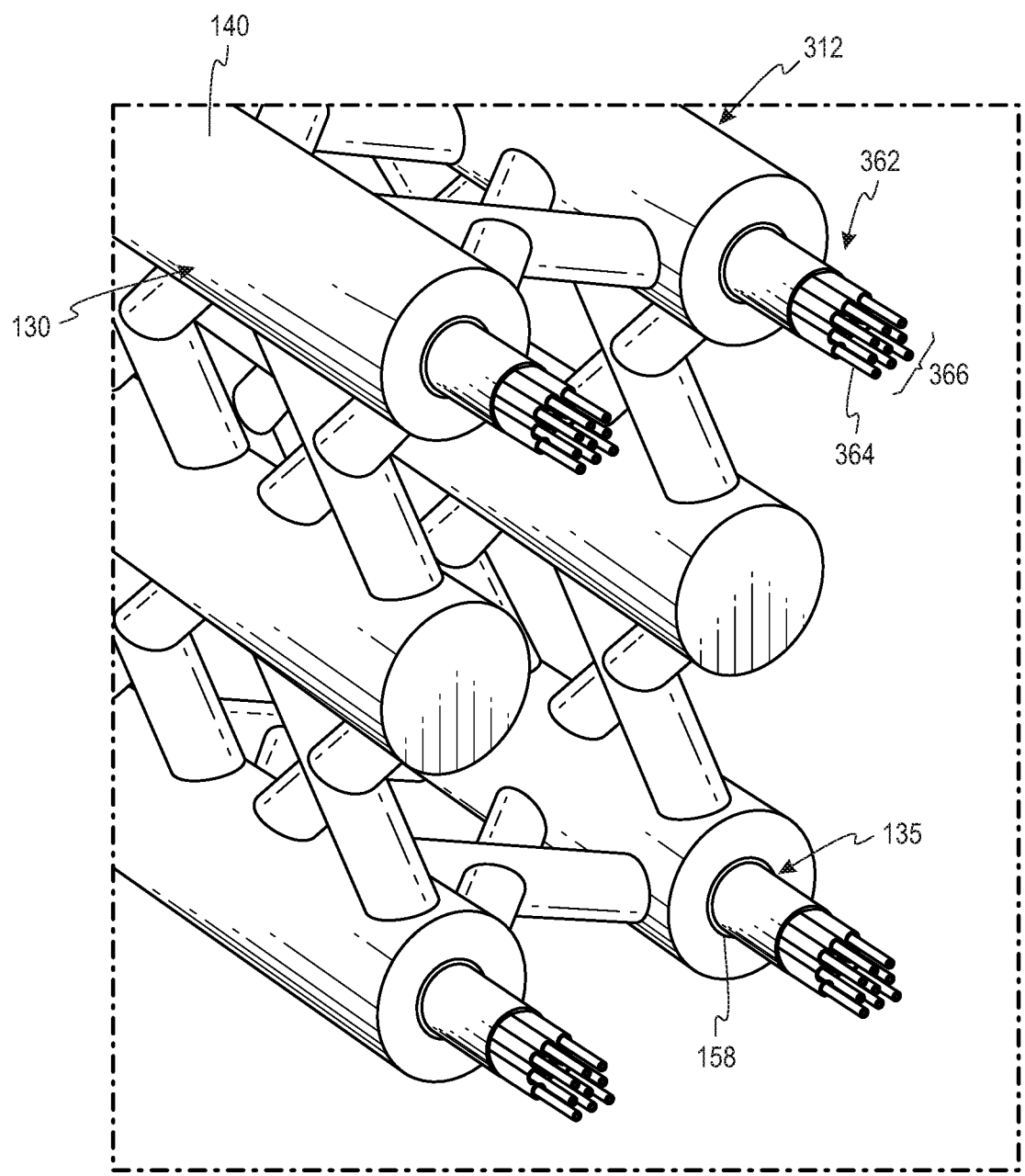
FIG. 3 illustrates a cross-sectional view of a truss member and a plurality of optical fibers, according to an example embodiment.

FIG. 3 depicts a cross-sectional view of a truss member 312 and a plurality of elongated structures 362 coupled to one or more retainers 135 of the truss member 312 according to an example embodiment. The truss member 312 can be substantially similar or identical to the truss members 112, 212 described above. As such, the truss member 312 includes the body 130, and the one or more retainers 135 can be conduits 158 extending through the body 130 (e.g., through the longitudinal portions 140 of the body 130). In FIG. 3, the elongated structures 362 include a plurality of optical fibers 364.

As shown in FIG. 3, the plurality of optical fibers 364 can include a plurality of bundles 366 of optical fibers 364, and each bundle 366 of optical fibers 364 can be coupled to a respective one of the one or more retainers 135. Specifically, in FIG. 3, each conduit 158 contains a respective one of the plurality of bundles 366 of optical fibers 364. Within examples, providing the plurality of bundles 366 of optical fibers 364 can help to increase data throughput (e.g., increase data-rate) and/or provide improved redundancy in the event of an operational transient for one or more of the optical fibers 364 and/or bundles 366 of optical fibers 364.

Accordingly, as shown in FIG. 3, the plurality of optical fibers 364 can be coupled to the one or more retainers 135 of the plurality of truss members 112, 212 in FIGS. 1A-2B. Additionally, as described above, for each truss member 112, 212, the one or more retainers 135 can include the one or more conduits 158 extending through the body 130 of the truss member 112, 212 from the first end 136 to the second end 138. Thus, in FIGS. 1A-2B, each conduit 158 can contain a respective one of the plurality of bundles 366 of optical fibers 364 as shown, for instance, in FIG. 3.

One benefit to coupling the elongated structures 362 to the conduit(s) 158 extending through the bodies 130 of the truss members 112, 212, 312 is that the conduit(s) 158 can substantially enclose relatively large portions of the elongated structures 362 and, thus, assist in protecting the elongated structures 362 from exposure to environmental conditions and/or inadvertent impacts. Another benefit is that it is relatively difficult (or impossible) for the elongated structures 362 to inadvertently decouple from the conduit(s) 158. However, in other example embodiments, the retainer(s) 135 can additionally or alternatively extend along an exterior of the bodies 130 of the truss members 112, 212, 312.

Figure 4:
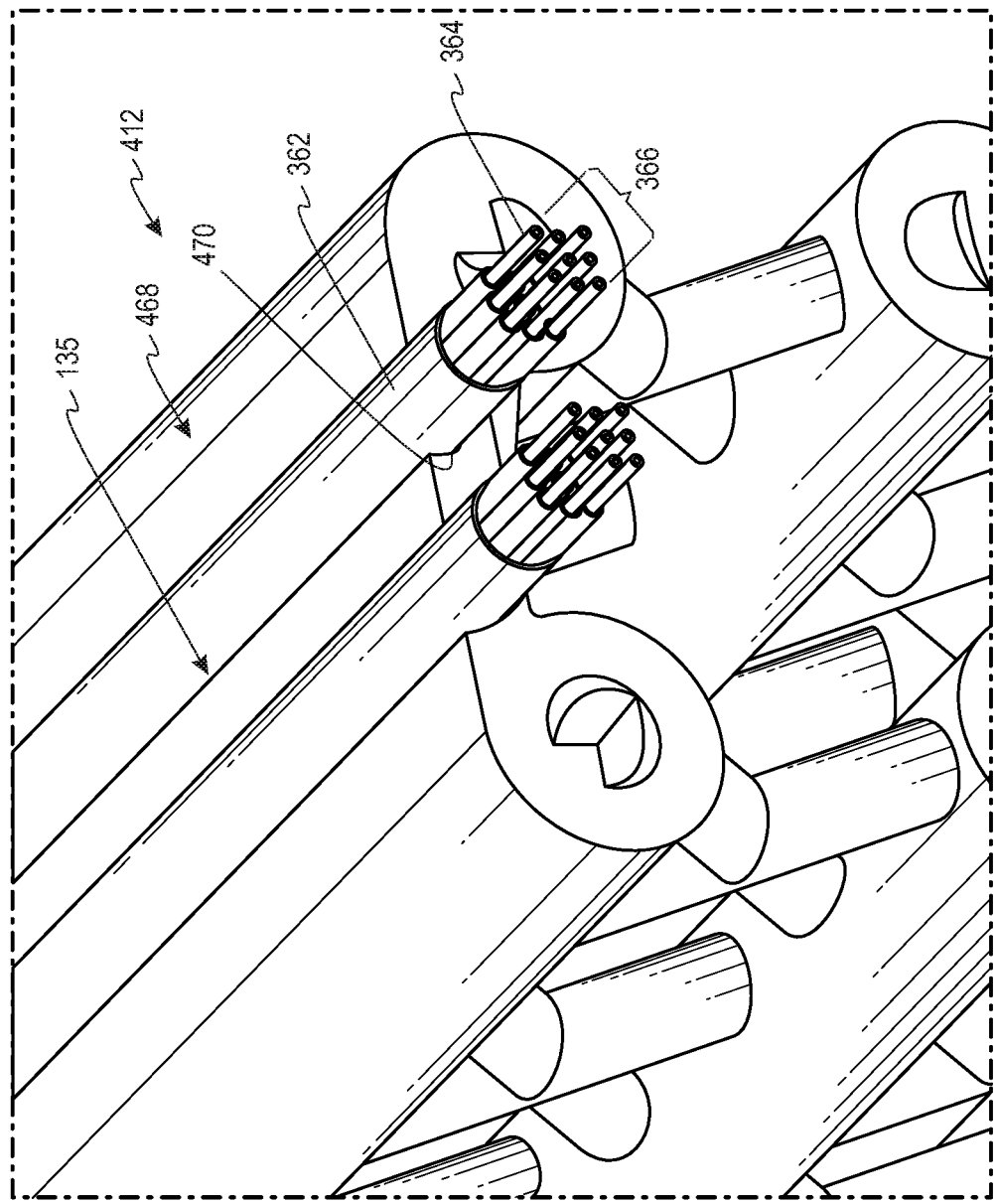
FIG. 4 illustrates a cross-sectional view of a truss member and a plurality of optical fibers, according to another example embodiment.

FIG. 4 depicts a cross-sectional view of a truss member 412 with the plurality of elongated structures 362 coupled to the one or more retainers 135 on an exterior 468 of the truss member 412 according to an example embodiment. The truss member 412 can be substantially similar or identical to the truss members 112, 212, 312 described above, except each of the one or more retainers 135 is a groove 470 extending along the exterior 468 of the body 130 of the truss member 412.

As shown in FIG. 4, the elongated structures 362 include the plurality of optical fibers 364 arranged in the bundles 366 of optical fibers 364. Additionally, each bundle 366 of optical fibers 364 is coupled to a respective one of the grooves 470 extending along the exterior 468 of the body 130. For example, each groove 470 can be configured to retain a respective elongated structure 362 by a press-fit coupling between the groove 470 and the elongated structure 362. That is, each groove 470 can be configured to retain a respective one of the plurality of bundles 366 of optical fibers 364 by the press-fit coupling. Accordingly, each elongated structure 362 can have a size and/or a shape that corresponds to a size and/or a shape of a respective one of the grooves 470 to facilitate the press-fit coupling between the elongated structure 362 and the groove 470.

One benefit to providing the retainer(s) 135 as the groove(s) 470 on the exterior 468 of the bodies 130 of the truss members 112, 212, 312, 412 is that the retainer(s) 135 can provide for quick and easy access to the elongated structure(s) 362 coupled to the retainer(s) 135. This can facilitate performing installation, maintenance, and repair operations for the structural frame 100 and/or the elongated structure(s) 362 in a convenient and efficient manner.

Although the truss members 112, 212, 312 shown in FIGS. 1A-3 include the retainer(s) 135 as the conduits 158, the truss members 112, 212, 312 shown in FIGS. 1A-3 can additionally or alternatively include the retainer(s) 135 as the grooves 470 shown in FIG. 4. Accordingly, in FIGS. 1A-3, for at least one of the plurality of truss members 112, 212, 312, the one or more retainers 135 can include the groove 470 extending along the exterior 468 of the body 130 of the truss member 112, 212, 312 from the first end 136 to the second end 138 according to other example embodiments. Additionally, in such example embodiments, each groove 470 is configured to retain the elongated structure 362 by the press-fit coupling between the groove 470 and the elongated structure 362. For instance, for each truss member 112, 212, 312, each retainer 135 can include each groove 470 can be configured to retain a respective one of the plurality of bundles 366 of optical fibers 364 by a press-fit coupling as shown in FIG. 4.

In some examples, the optical fibers 364 can be used as a medium for communicating data. In additional or alternative examples, the optical fibers 364 can be used to monitor a condition of the structural frame 100. For instance, within examples, the structural frame 100 can include a fiber optic sensing system (FOSS) that can monitor a strain and/or shape of one or more of the truss members 112 and/or the hub 110 of the structural frame 100. As examples, the FOSS can beneficially facilitate (i) structural monitoring for relatively complex bending modes of in-flight aircraft, (ii) aeroelastic feedback control, (iii) end-of-life cycle decision making, (iv) repair and maintenance scheduling, and/or (v) load balancing decision making (e.g., balancing of passengers, fluids, ballast, and/or luggage on an aircraft and/or a vehicle).

Figure 5:
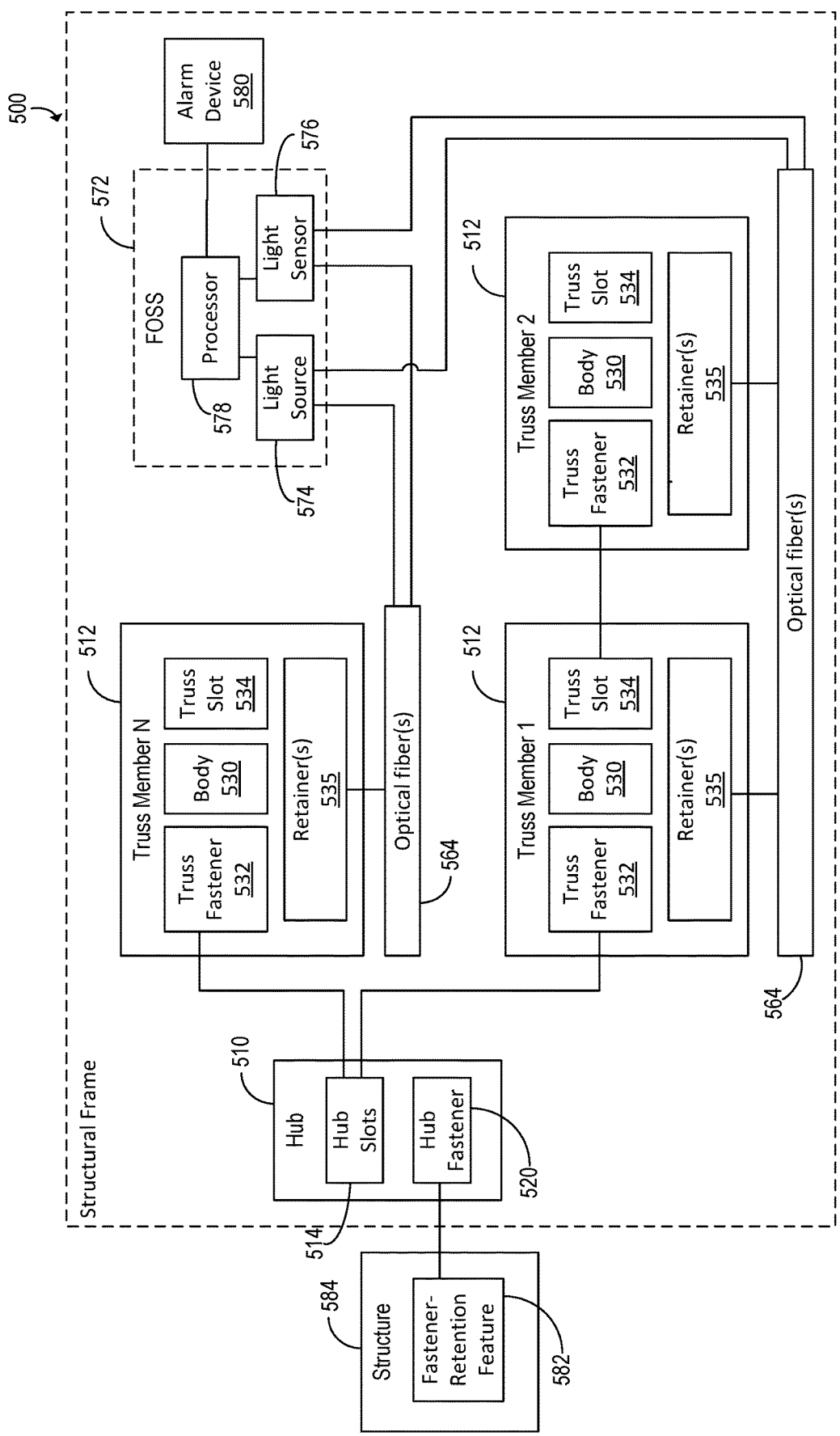
FIG. 5 a simplified block diagram of the structural frame, according to another example embodiment.

Referring now to FIG. 5, a simplified block diagram of the structural frame 500 including a FOSS system 572 is depicted according to an example embodiment. As shown in FIG. 5, the structural frame 500 includes a hub 510 and a plurality of truss members 512. The hub 510 can correspond to the hub 110 described above, and the truss members 512 can correspond to the truss members 112, 212, 312, 412 described above. Accordingly, as shown in FIG. 5, the hub 510 includes a plurality of hub slots 514 (which are around the perimeter of the hub 510) and a hub fastener 520. Although the structural frame 500 is shown having one hub 510 and three truss members 512, the structural frame 500 can include a lesser quantity or a greater quantity of the hubs 510 and/or the truss members 512 in other examples. For instance, as shown in FIG. 5, the structural frame 500 can include N truss members 512 where N is an integer value that is equal to or greater than 1.

Additionally, as shown in FIG. 5, each truss member 512 can be a monolithic structure that includes a body 530, a truss fastener 532, a truss slot 534, and one or more retainers 535. As described above, for each truss member 512, (i) the body 530 extends from a first end of the truss member 512 to a second end of the truss member 512, (ii) the truss fastener 532 is at the first end and coupled with a respective one of the plurality of the hub slots 514 of the hub 510 or the truss slot 534 of another truss member 512, and (iii) the one or more retainers 535 extend along the body 530 between the first end and the second end. For instance, as described above, the one or more retainers 535 can include one or more conduits (e.g., the conduits 158) and/or one or more grooves (e.g., the grooves 470) extending along the body 530.

As also shown in FIG. 5, one or more optical fibers 564 can be coupled to the one or more retainers 535 of the truss members 512. For instance, the one or more optical fibers 564 can be a plurality of optical fibers 564, which include a plurality of bundles of optical fibers 564. In this arrangement, the optical fiber(s) 564 extend along the truss members 512.

The FOSS 572 can include a light source 574, a light sensor 576 (e.g. detector), and a processor 578. The light source 574 can transmit light along the optical fiber(s) 564. As examples, the light source 574 can include one or more laser light sources. For instance, in one implementation, the light source 574 can include a plurality of laser sources and each laser source can transmit light along a respective bundle of the optical fiber(s) 564. In some examples, the light source 574 can generate the light at a wavelength between approximately 400 nanometers (nm) and approximately 700 nm.

In some examples, the light source 574 can transmit the light at a common wavelength along all of the optical fiber(s) 564. In other examples, the light source 574 can transmit the light at a first wavelength along one of the optical fibers 564, and the light source 574 can transmit the light a second, different wavelength along another one of the optical fibers 564.

The optical fiber(s) 564 are configured to reflect the light transmitted by the light source 574. For example, the optical fiber(s) 564 can include one or more gratings (e.g., one or more fiber Bragg gratings), which reflect the light at one or more points along the optical fiber(s) 564. The light sensor 576 is configured to sense the light reflected by the optical fiber(s) 564. As examples, the light sensor 576 can include one or more photo diodes, charge-coupled device (CCD) sensors, complementary metal-oxide semiconductor (CMOS) sensors, and/or an electron multiplying CCD (EMCCD).

The processor 578 is in communication with the light sensor 576 (e.g. via a wired communication link and/or a wireless communication link) and is configured to determine, based on the light sensed by the light sensor 576, a physical condition of at least one truss member 512. For instance, for the at least one truss member 512, the physical condition determined by the processor 578 can be a strain on the at least one truss member 512 and/or a shape of the at least one truss member 512.

In one implementation, the processor 578 can be configured to, for each truss member 512 of the at least one truss member 512: (i) determine, based on the light sensed by the light sensor 576, a parameter related to the physical condition of the truss member 512, (ii) perform a comparison of the parameter to a predetermined range of values, (iii) determine, based on the comparison, that the parameter is outside of the predetermined range of values, and (iv) responsive to a determination that the parameter is outside the predetermined range of values, generate an alarm signal to indicate that an out-of-tolerance condition occurred for the truss member 512. In an example, the predetermined range of values can relate to an amount of strain and/or an extent of shape change that is expected to occur during normal operation of a system in which the structural frame 100 is located. Thus, the alarm signal can be generated to provide an indication that the at least one truss member 512 experienced a relatively large and/or a relatively low amount of strain and/or shape change. In some examples, the alarm signal can indicate that a responsive action and/or corrective action should be taken (e.g., a need for a control input).

As shown in FIG. 5, the processor 578 can be in communication with an alarm device 580 (i.e., a notification device). The alarm device 580 can receive the alarm signal from the processor 578 and, in response to the alarm signal, the alarm device 580 can generate an audible and/or visual indication. For instance, the alarm device 580 can include one or more speakers, indicator lights, and/or displays for providing the audible and/or visual indication. The alarm device 580 can additionally or alternatively generate an olfactory indication (e.g., a pheromonal indication). Optionally, the alarm device 580 can be occluded from human detection (i.e., the alarm device 580 may not be visible).

The processor 578 can additionally or alternatively generate and store log data relating to the physical condition determined by the processor 578. The processor 578 can generate and store the log data continuously, periodically, and/or responsive to external events. The log data can, for instance, assist in evaluating a condition of the structural frame 500 at a later time and making end-of-life cycle, repair, and/or maintenance decisions.

The processor 578 can be implemented using hardware, software, and/or firmware. For example, the processor 578 can include one or more processors and a non-transitory computer readable medium (e.g., volatile and/or non-volatile memory) that stores machine language instructions or other executable instructions. The instructions, when executed by the one or more processors, cause the FOSS 572 to carry out the various operations described herein. The processor 578, thus, can receive data and store the data in the memory as well.

Additionally, in FIG. 5, the hub fastener 520 is coupled to a fastener-retention feature 582 of a structure 584. For instance, in an implementation in which the structural frame is a part of an aircraft, the structure 584 can include a bulkhead, a strong-back, a rib, a spar, a landing gear assembly, a step-ladder, and/or a storage bin of the aircraft. In one example, fastener-retention feature 582 can include an aperture in the structure 584 and the hub fastener 520 can be coupled to the fastener-retention feature 582 by a retaining ring (e.g., the retaining ring 152) in a manner similar to that described above for the coupling between the truss fasteners 132 and the hub slots 114. As another example, the hub fastener 520 can include a first thread, the fastener-retention feature 582 can include a second thread, and the hub fastener 520 can couple to the fastener-retention feature 582 via a threaded coupling between the first thread and the second thread. Other examples may also be possible.

As described above, each truss member 112, 212, 312, 412, 512 can include one or more retainers 135, 535 coupled to one or more optical fibers 364, 564 in one or more bundles 366. Within examples, a benefit to including a bundle 366 of optical fibers 364, 564 is that there is redundancy in the event that an optical fiber 364, 564 in the bundle experiences an operational transient. Additionally, for example, a benefit to including a plurality of the bundles 366 at different locations on or in a particular truss member 112, 212, 312, 412, 512 is that the FOSS 572 can receive greater amounts of data that can help to determine the physical condition of the truss member 112, 212, 312, 412, 512 with finer granularity and/or greater precision.

For illustrative purposes only, as one example, FIG. 17 depicts a plurality of transforms 1700A-1700G that can be performed by the processor 578 of the FOSS 572 to determine, based on light signals detected by the light sensor 574, the physical condition of at least one truss member 512. In FIG. 17, a variable "a" represents a parameter based on a light signal detected by the light sensor 576 in an upper-left one of the bundles 366 of optical fibers 364 in FIG. 3, a variable "b" represents a parameter based on a light signal detected by the light sensor 576 in an upper-right one of the bundles 366 of optical fibers 364 in FIG. 3, a variable "c" represents a parameter based on a light signal detected by the light sensor 576 in a lower-left one of the bundles 366 of optical fibers 364 in FIG. 3, and a variable "d" represents a parameter based on a light signal detected by the light sensor 576 in a lower-right one of the bundles 366 of optical fibers 364 in FIG. 3. Although FIG. 17 illustrates an example in which the processor 578 determines the physical condition of the truss member 512 based on a plurality of light signals in a plurality of bundles 366 of optical fibers 364, the processor 578 can determine the physical condition of the truss member 512 based on one or more light signal detected in one or more optical fibers 364 in other examples. In other examples, the processor 578 can use additional or alternative transforms and/or parameters to carry out the operations of the FOSS 572.

In the examples shown in FIGS. 3 and 4, the truss member 312, 412 includes four bundles 366, which each include nine optical fibers 364. This arrangement can provide a relatively good balance between cost, space, performance, and redundancy considerations in some implementations (e.g., in an implementation in which the structural frame 100 is provided in a fuselage of an aircraft). However, one or more of the truss members 112, 212, 312, 412, 512 can include a lesser quantity and/or a greater quantity of bundles 366 in other example embodiments. Additionally, one or more of the truss members 112, 212, 312, 412, 512 can include a lesser quantity and/or a greater quantity of optical fibers 364 per bundle 366 in other example embodiments.

As described above, the hub 110, 510 can be coupled to the truss members 112, 212, 312, 412, 512 by the retaining rings 152. In some examples, one or more of the truss members 112, 212, 312, 412, 512 can be coupled to the hub 110, 510 in a manner that allows for rotation of the truss member(s) 112, 212, 312, 412, 512 relative to the hub 110, 510. By allowing for such rotation, a risk of forming a hard point at a coupling between the truss member(s) 112, 212, 312, 412, 512 and the hub 110, 510 can be reduced (or minimized). This can help to enhance the structural integrity of the structural frame 100 and a structure to which the structural frame 100 may be coupled (e.g., via the hub fastener 120).

Figure 6:
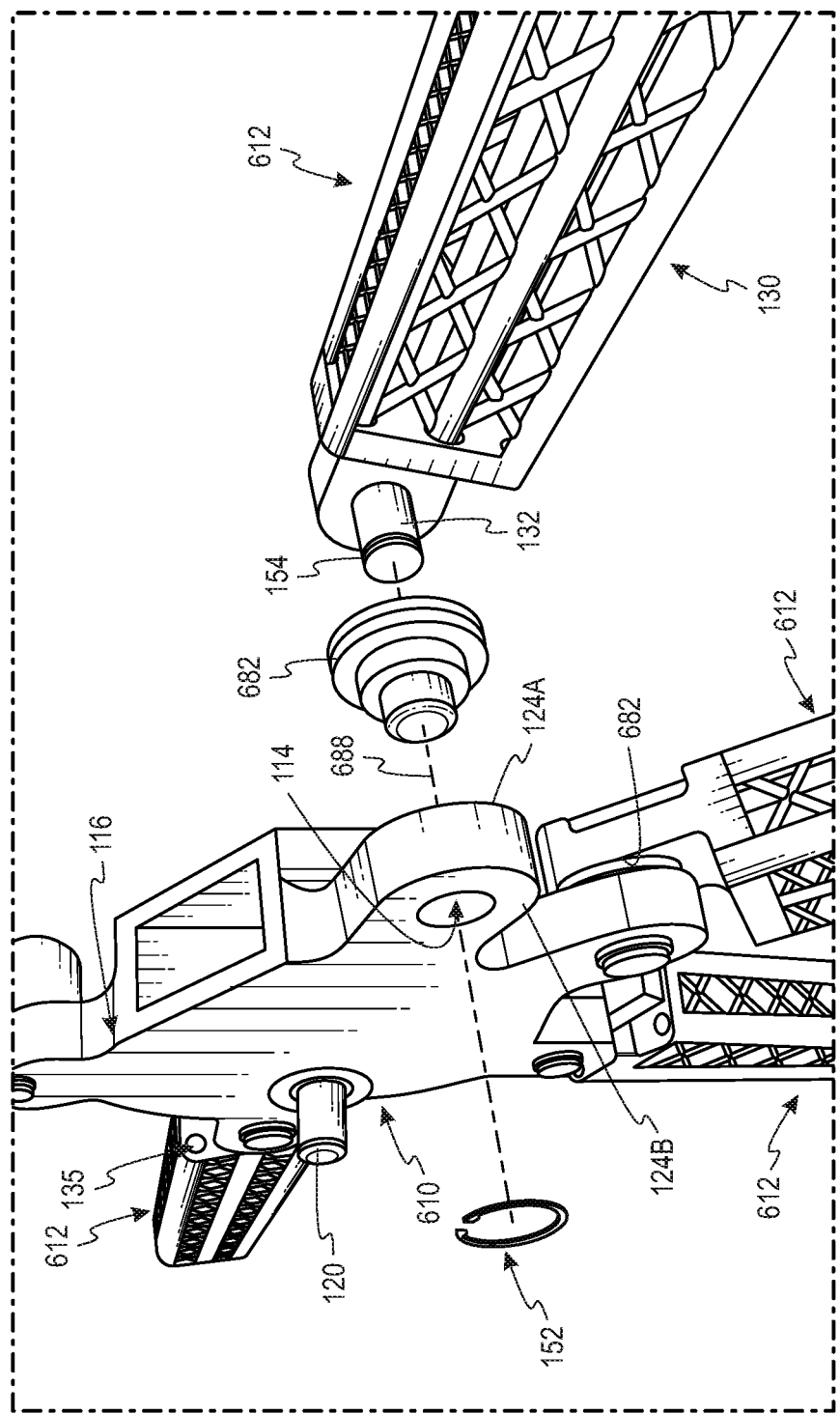
FIG. 6 illustrates a partially exploded view of the structural frame, according to another example embodiment.

In some examples, where one or more truss members 112, 212, 312, 412, 512 rotate relative to the hub 110, 510, the truss fastener 132, 532 of the truss member(s) 112, 212, 312, 412, 512 can be coupled to the respective hub slot 114, 514 by a bearing 682. FIG. 6 depicts a hub 610 coupled to a first set of truss members 612 by a plurality of bearings 682 according to an example embodiment. The hub 610 can be substantially similar or identical to the hub 110, 510 described above, and the first set of truss members 612 can be substantially similar or identical to any of the truss members 112, 212, 312, 412, 512 described above. As such, the hub 610 can include the plurality of hub slots 114 around the perimeter 116 of the hub 610, and the hub fastener 120. Additionally, each of the first set of truss members 612 can be a respective monolithic structure that includes the body 130, the truss fastener 132, the truss slot 134, and the one or more retainers 135. In other examples, one or more of the truss members 112, 212, 312, 412, 512 do not rotate relative to the hub 110, 510.

As shown in FIG. 6, each truss member 612 of the first set can be coupled to a respective hub slot 114 of the plurality of hub slots 114 by a respective bearing 682 that is (i) in the respective hub slot 114 and (ii) surrounding the truss fastener 132 of the truss member 612. Thus, in FIG. 6, for each truss member 612 of the first set: (i) the truss fastener 132 extends, from the first side 124A of the hub 610 to the second side 124B of the hub 610, through the respective hub slot 114 of the plurality of hub slots 114 and the respective bearing 682, (ii) the truss fastener 132 includes the notch 154 on the second side 124B of the hub 610, and (iii) a respective retaining ring 152 of the plurality of retaining rings 152 is coupled to the notch 154 of the truss fastener 132 on the second side 124B of the hub 610 such that the respective retaining ring 152 inhibits withdrawal of the truss fastener 132 from the respective hub slot 114. In this arrangement, each truss member 612 of the first set is rotatable, about an axis 688 of the truss fastener 132 of the truss member 612, relative to the hub 610.

Figure 7:
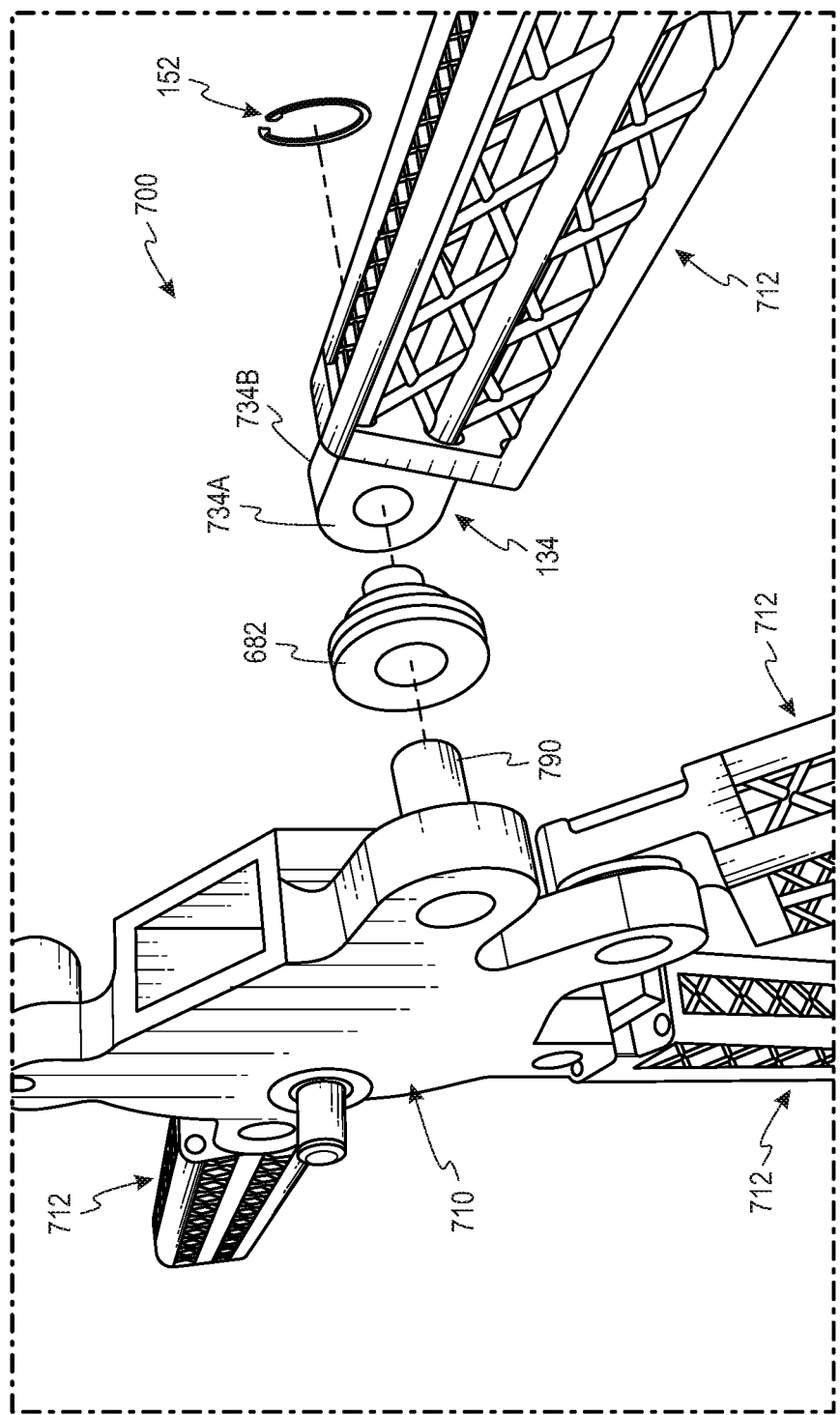
FIG. 7 illustrates a partially exploded view of the structural frame, according to another example embodiment.

In the examples depicted in FIGS. 1A-6, the hub 110, 510, 610 includes a plurality of hub slots 114, and each truss member 112, 212, 312, 412, 512, 612 includes a truss fastener 132, 532 for coupling with a respective hub slot 114 of the hub 110, 510, 610. In other examples, one or more of the truss members 112, 212, 312, 412, 512, 612 can couple to the hub 110, 510, 610 via the truss slot 134, 534 instead of the truss fastener 132, 532. FIG. 7 depicts a partial perspective view of a structural frame 700 according to one such example embodiment. As shown in FIG. 7, the structural frame 700 includes a hub 710 and a plurality of truss members 712. The truss members 712 can be substantially similar or identical to the truss members 112, 212, 312, 412, 512, 612 described above. The hub 710 can be substantially similar or identical to the hub 110, 510, 610 described above, except the hub 710 can include a plurality of hub-truss fasteners 790 for coupling with the truss slot 134, 534 of the truss members 712.

For instance, as shown in FIG. 7, for each truss member 712: (i) a respective hub-truss fastener 790 of the plurality of hub-truss fasteners 790 can extend through the truss slot 134 from a first side 734A of the truss slot 134 to a second side 734B of the truss slot 134, and optionally through a respective bearing 682, (ii) the respective hub-truss fastener 790 can include a notch 792 on the second side 734B of the truss slot 134, and (iii) a respective retaining ring 152 of the plurality of retaining rings 152 is coupled to the notch 792 of the hub-truss fastener 790 on the second side 734B of the truss slot 134 such that the respective retaining ring 152 inhibits withdrawal of the respective hub-truss fastener 790 from the truss slot 134.

In the examples described above with respect to FIGS. 1A-7, the structural frame 100, 500, 700 includes a hub 110, 510, 610, 710 to which the truss members 112, 212, 312, 412, 512, 612, 712 couple. The hub 110, 510, 610, 710 can beneficially provide for coupling a plurality of truss members 112, 212, 312, 412, 512, 612, 712 to each other and/or to another structure (e.g., the structure 584) at a common point. Additionally, for example, the hub 110, 510, 610, 710 can help to mitigate hard points by allowing for the plurality of truss members 112, 212, 312, 412, 512, 612, 712 to rotate relative to each other.

Figure 8:
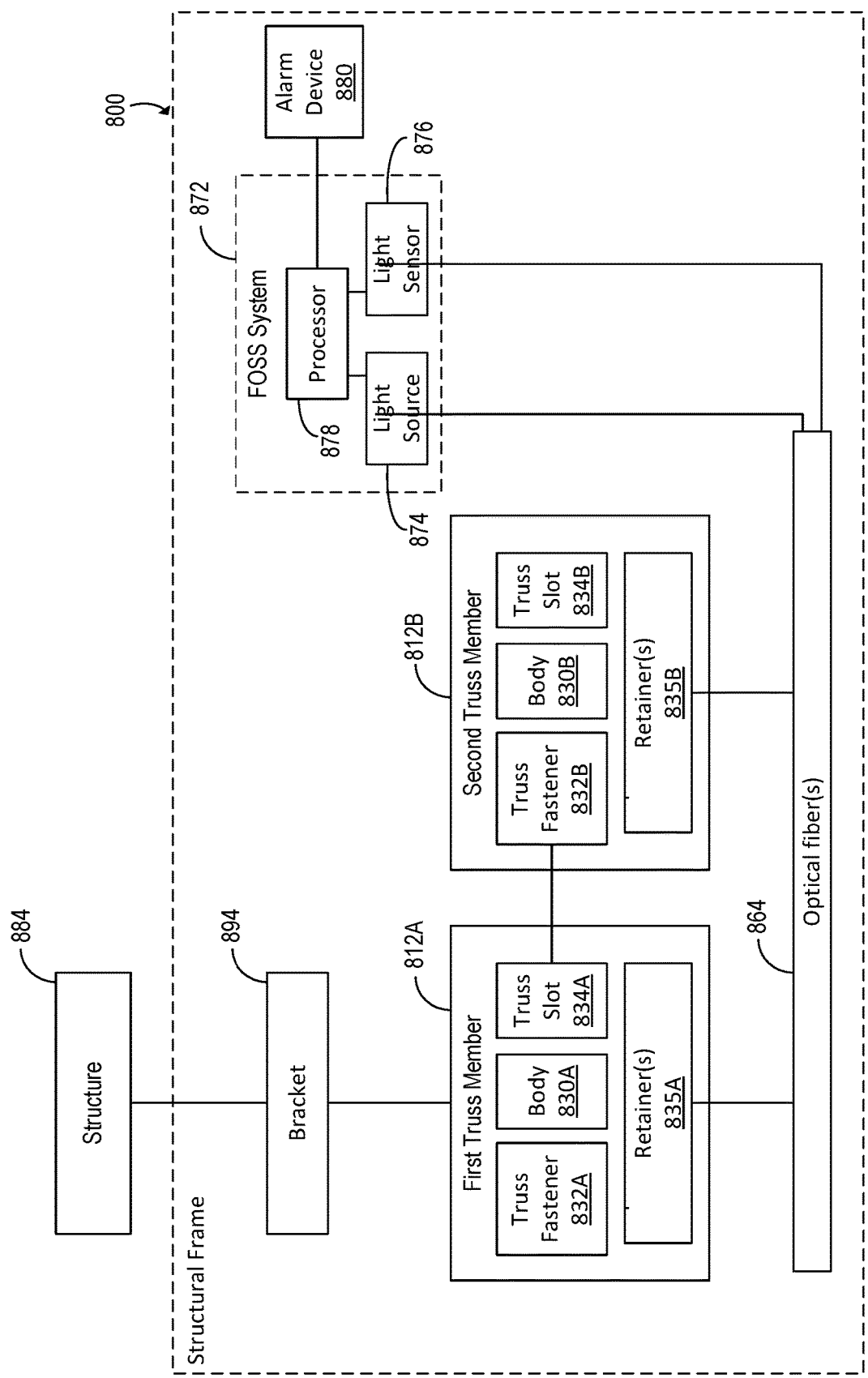
FIG. 8 a simplified block diagram of the structural frame, according to another example embodiment.

In another example embodiment, the truss members 112, 212, 312, 412, 512, 612, 712 can form a structural frame that omits the hub 110, 510, 610, 710. As one example, FIG. 8 depicts a simplified block diagram of a structural frame 800 including a FOSS 872. As shown in FIG. 8, the structural frame 800 includes a first truss member 812A and a second truss member 812B. The first truss member 812A and the second truss member 812B can be substantially similar or identical to the truss members 112, 212, 312, 412, 512, 612, 712 described above. For instance, the first truss member 812A can be a monolithic structure, and the second truss member 812B can be a monolithic structure as described above.

The first truss member 812A includes a first body 830A extending from a first end of the first truss member 812A to a second end of the first truss member 812A. The first truss member 812A also includes a first truss fastener 832A at the first end of the first truss member 812A, a first truss slot 834A at the second end of the first truss member 812A, and a first retainer 835A extending along the first body 830A between the first end and the second end of the first truss member 812A.

The second truss member 812B is coupled to the first truss member 812A as described above. The second truss member 812B includes a second body 830B extending from a first end of the second truss member 812B to a second end of the second truss member 812B. The second truss member 812B also includes a second truss fastener 832B at the first end of the second truss member 812B and coupled to the first truss slot 834A of the first truss member 912A. The second truss member 812B further includes a second truss slot 834B at the second end, and a second retainer 835B extending along the second body 830B between the first end and the second end of the second truss member 812B.

Additionally, as shown in FIG. 8, one or more optical fiber 864 are coupled to the first retainer 835A of the first truss member 812A and the second retainer 835B of the second truss member 812B. The optical fiber(s) 835 are coupled to the FOSS 872 configured to sense light reflected in the optical fiber(s) 864 and determine, based on the light, a physical condition of the first truss member 812A and the second truss member 812B. For instance, as shown in FIG. 8, the FOSS 872 can include a light source 874, a light sensor 876, and a processor 878 as described above. Additionally, as described above, the processor 878 can be in communication with an alarm system 880 (i.e., a notification system), which can generate an audible indication alarm, an olfactory indication and/or a visual indication responsive to an alarm signal generated by the processor 878 as described above.

In the structural frame 800 shown in FIG. 8, the first truss member 812A is coupled to a structure 884 by a bracket 894. For instance, in an implementation in which the structural frame 800 is a part of an aircraft, the structure 884 can include a bulkhead, a strong-back, a rib, a spar, a landing gear assembly, a step-ladder, and/or a storage bin of the aircraft.

Although the structural frame 800 is shown in FIG. 8 having two truss members 812A-812B, the structural frame 800 can include a lesser quantity or a greater quantity of truss members 812A-812B in other examples. More specifically, the structural frame 800 can include M truss members 812A-812B where M is an integer value that is equal to or greater than 2.

Figure 9:
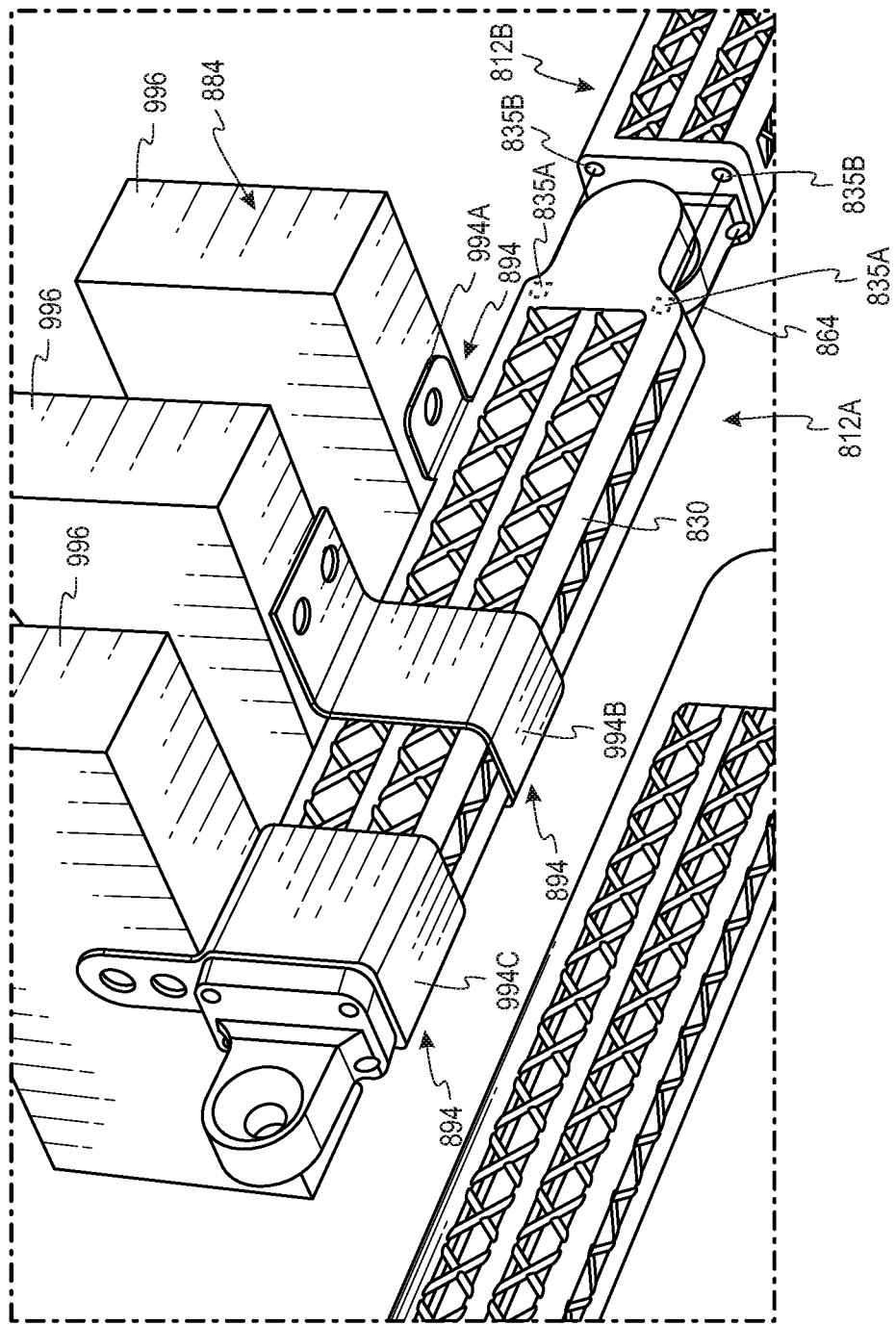
FIG. 9 illustrates a perspective view of a structural frame, according to another example embodiment.

Referring now to FIG. 9, a partial perspective view of the structural frame 800 is depicted according to an example embodiment. As shown in FIG. 9, the first truss member 812A is coupled to the second truss member 812B, and the first truss member 812A is coupled to the structure 884 by the bracket 894. Specifically, in FIG. 9, the bracket 894 is configured to couple the first truss member 812A to a bulkhead 996 of an aircraft.

In this example, the bracket 894 can include a first bracket 994A, a second bracket 994B, and/or a third bracket 994C. In other examples, the bracket 894 can include a different quantity of one or more of the brackets 994A-994C. In some instances, the type and/or quantity of brackets 994A-994C used to couple the truss members 812A-812B to the structure 884 can be based on the structure 884 and/or the expected loads on the truss members 812A-812B.

As shown in FIG. 9, the first truss member 812A includes the first bracket 994A such that the first bracket 994A is a part of the monolithic structure of the first truss member 812A. Providing the first bracket 994A as a part of the monolithic structure of the first truss member 812A can assist in assembly and coupling of the first truss member 812A to the bulkhead 996.

The second bracket 994B is configured to enclose a portion of the first body 830A of the first truss member 812A between the second bracket 994B and the structure 884 (i.e., the bulkhead 996). Additionally, the second bracket 994B can include a plurality of flange portions having one or more apertures for coupling the second bracket 994B to the structure 884 on opposing sides of the first truss member 812A. The third bracket 994C is configured to entirely surround a portion of the first body 830A of the first truss member 812A. The third bracket 994C can include an anchor tab including one or more apertures to facilitate coupling the third bracket 994C to the bulkhead 996.

Additionally, as shown in FIG. 9, the first retainer 835A is axially aligned with the second retainer 835B. This can help to route the optical fiber 864 along the first truss member 812A and the second truss member 812B. In some examples, the first retainer 835A can be coplanar with the second retainer 835B. This may also help to route the optical fiber 864 along the first truss member 812A and the second truss member 812B.

Figure 10A:
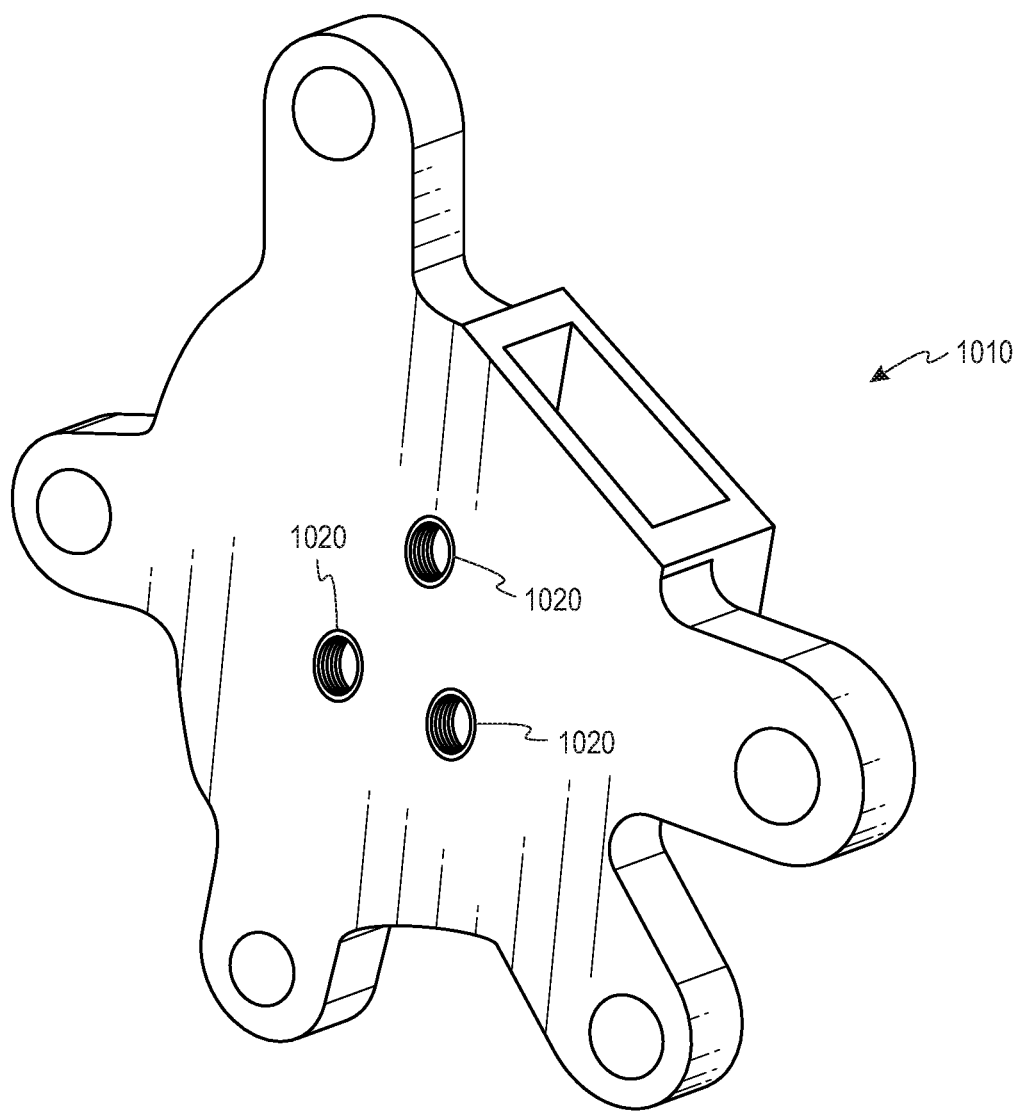
FIG. 10A illustrates a perspective view of a hub, according to another example embodiment.

In the examples shown in FIGS. 1A-2A, 6, and 7, the hub 110 includes the hub fastener 120 in the form of the protrusion 127. In further examples, the hub 110, 510, 610, 710, 1010 can additionally or alternatively include different forms of hub fasteners. For instance, FIG. 10A illustrates a hub 1010 including a hub fastener 1020 according to another example embodiment. As shown in FIG. 10A, the hub fastener 1020 can include one or more threaded bores, which can be coupled to respective bolt(s). This can facilitate coupling one or more objects (e.g., one or more video monitors, branding features, shelves, seats, and/or bassinet) to the hub 1010. This may be beneficial, for example, in implementations in which the hub 1010 is a part of a structural frame located in a wall-like structure (e.g., a partition, a closet, a lavatory, and/or a passenger cabin). This may also facilitate assembling, maintaining, repairing, and/or replacing the objects in a system including the hub 1010.

Figure 10B:
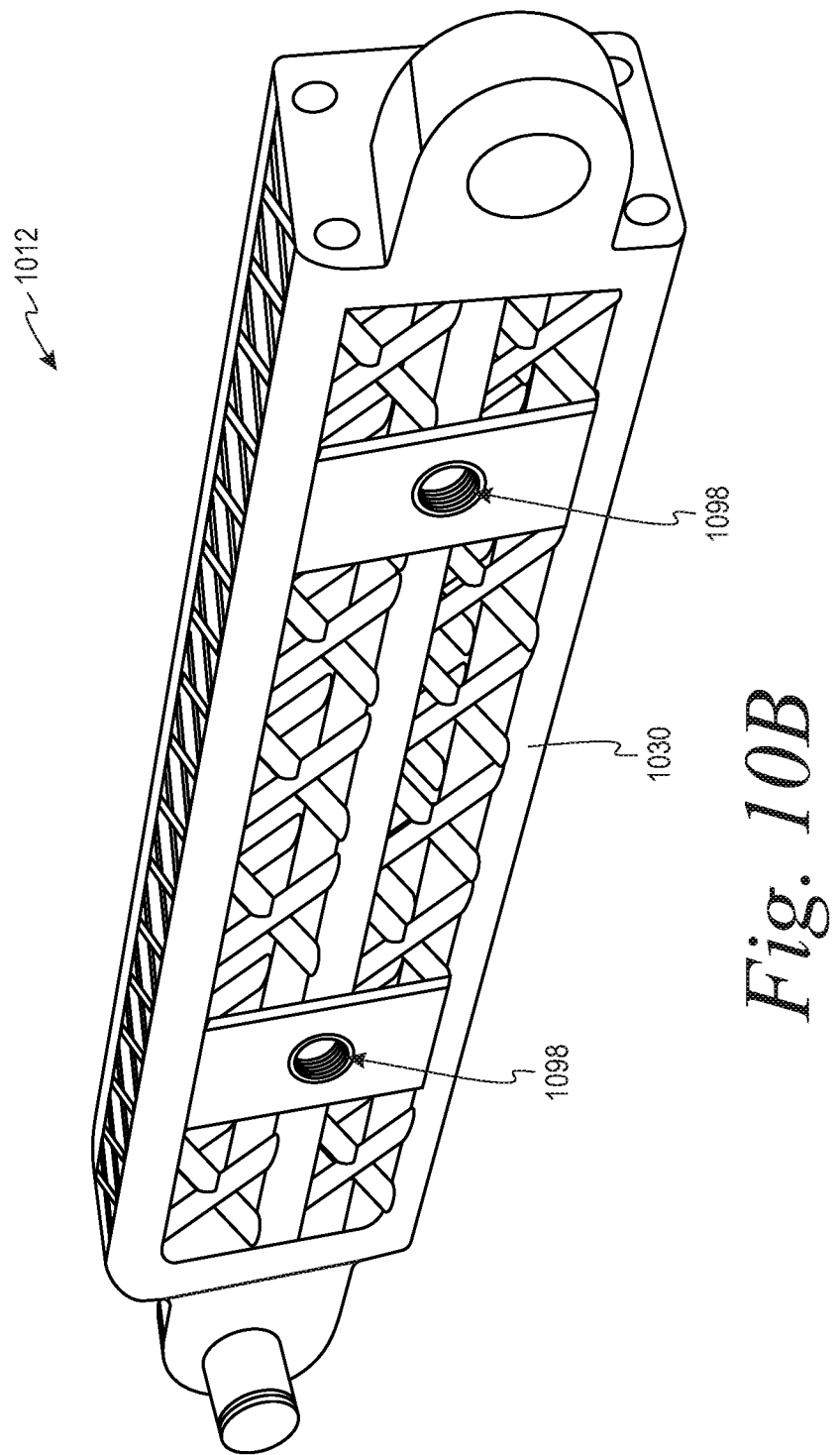
FIG. 10B illustrates a perspective view of a truss member, according to another example embodiment.

Also, in some examples, one or more of the truss members 112, 212, 312, 412, 512, 612, 712, 1012 can include one or more threaded bores for coupling with objects by a bolt. As one example, FIG. 10B illustrates a truss member 1012 that includes a plurality of threaded bores 1098 in a body 1030. Accordingly, the truss member 1012 can couple to one or more objects (e.g., one or more video monitors, branding features, shelves, seats, and/or bassinet) via a bolt in threaded engagement with the threaded bores 1098. This also may be beneficial, for example, in implementations in which the truss member 1012 is a part of a structural frame located in a wall-like structure (e.g., a partition, a closet, a lavatory, and/or a passenger cabin). This may also facilitate assembling, maintaining, repairing, and/or replacing the objects in a system including the truss member 1012.

As described above, the truss members 112, 212, 312, 412, 512, 612, 712, 812A-812B, 1012 and/or the hubs 110, 510, 610, 710, 810, 1010 can provide basic building blocks for forming the structural frame 100, 500, 700, 800. Additionally, as noted above, although the truss members 112, 212, 312, 412, 512, 612, 712, 812A-812B, 1012 are generally linear shaped structures in FIGS. 1A-9 and 10B, the truss members 112, 212, 312, 412, 512, 612, 712, 812A-812B, 1012 can have other shapes and/or size in other examples.

Figure 11:
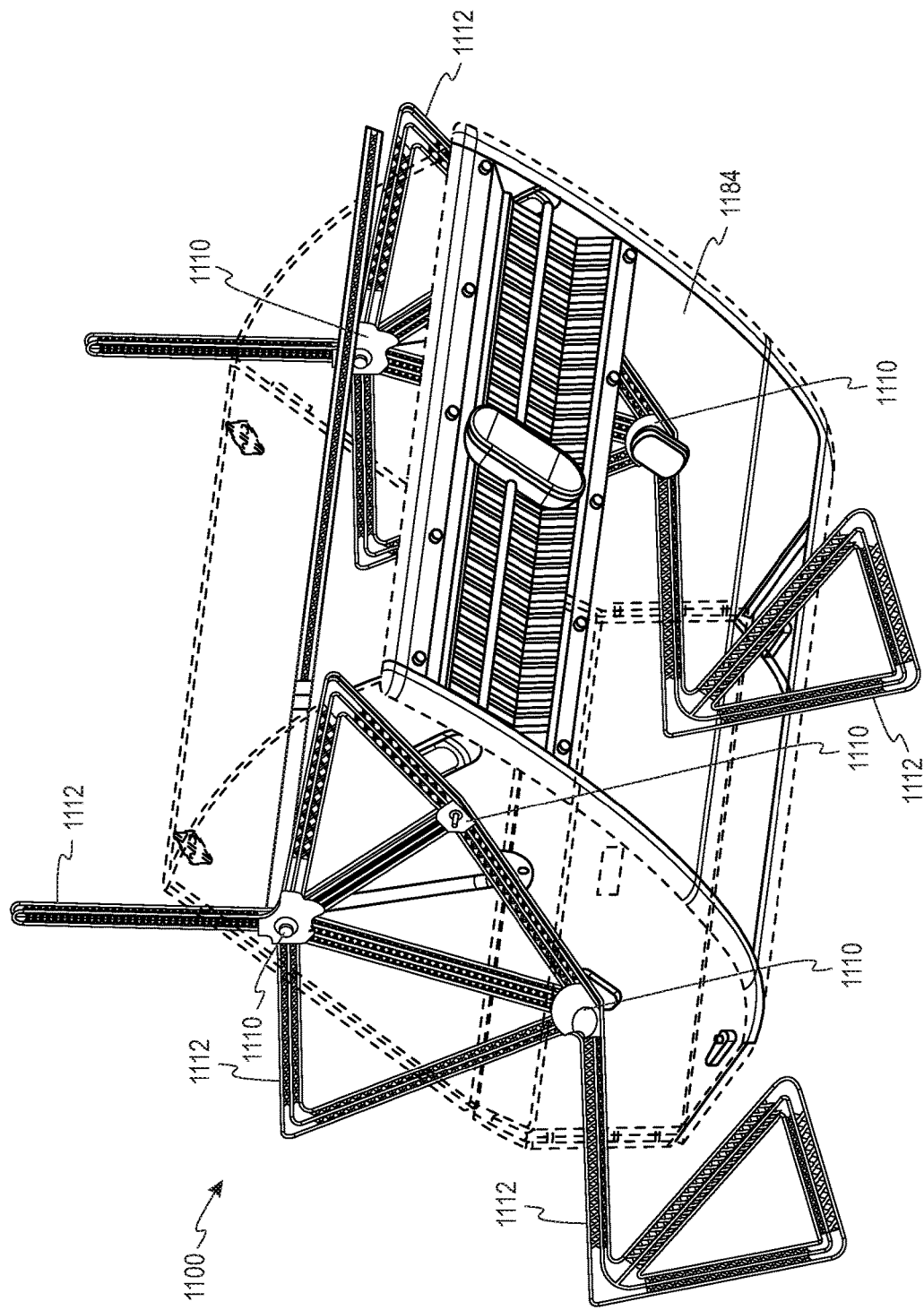
FIG. 11 illustrates a perspective view of a structural frame coupled to a storage bin, according to an example embodiment.

As one example, FIG. 11 depicts a structural frame 1100 coupled to a storage bin 1184. As shown in FIG. 11, the structural frame 1100 includes a plurality of truss members 1112 coupled to each other and/or coupled to a plurality of hubs 1110. The hubs 1110 are coupled to the storage bin 1184 (e.g., via the hub fastener 120). Additionally, as shown in FIG. 11, one or more of the truss members 1112 has a non-linear shape. The structural frame 1100 can be further coupled to a fuselage of an aircraft (e.g., via a hub fastener 120 of one or more of the hubs 1110). As such, the structural frame 1100 can directly couple the storage bin to the fuselage in contrast to some existing approaches, which require strongbacks, frames, and tierods to couple the storage bin to the fuselage. As such, the structural frames of the present disclosure can beneficially reduce the quantity of weak points, reduce the risk of an undetected hard point, and/or be lighter weight than existing approaches for coupling a secondary structure (such as the storage bin 1084) to the fuselage of the aircraft.

Additionally, as shown in FIG. 11, a plurality of relatively short components (i.e., the hubs 1110 and the truss members 1112) can be coupled to each other to form the structural frame 1100, which can extend over relatively long distances to support various loads with a system. In examples in which the elongated structures are retained in conduits extending through the structural frame 1100, the space between the conduits of adjacent components can help to facilitate assembling the elongated structures (e.g., optical fibers) in the conduits. For example, absent the space between the conduits of adjacent components, the elongated structures may need to be pulled through the structural frame using a pull wire attached to the elongated structures.

In the examples described above and illustrated in FIGS. 1A-11, the structural frames include an example quantity of hubs and/or truss members to facilitate describing various features of the structural frames. However, in other examples, the structural frames can additionally or alternatively include a lesser quantity and/or a greater quantity of the hubs and/or the truss members. Additionally, as described above, the truss members and/or hubs described herein can provide basic building blocks for forming a wide variety of differently shaped and/or sized structural frames.

Within examples, the structural frames 100, 500, 700, 800, 1100 can be provided in a vehicle. For instance, in some examples, the structural frames 100, 500, 700, 800, 1100 can be in an aircraft, a spacecraft, an automobile, a boat, a train, and/or a hyperloop. As additional examples, the structural frames 100, 500, 700, 800, 1100 can be provided in a bridge, a building, and/or devices.

Figure 12:
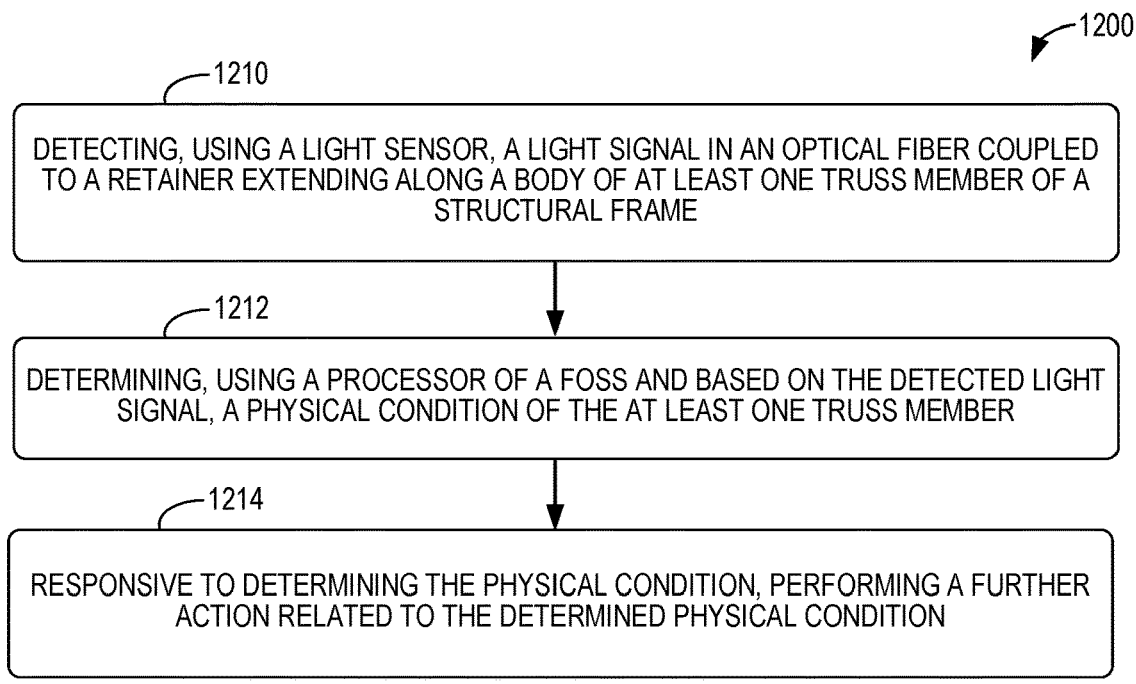
FIG. 12 illustrates a flow chart of an example process for monitoring a physical condition of a structural frame, according to an example embodiment.

Referring now to FIG. 12, a flowchart for a process 1200 of monitoring a physical condition of a structural frame (e.g., a structural frame in an aircraft) is described according to an example embodiment. The structural frame includes a plurality of truss members. Each truss member is a monolithic structure that includes a body and a retainer. As shown in FIG. 12, at block 1210, the process 1200 includes detecting, using a light sensor, a light signal in an optical fiber that is coupled to the retainer extending along the body of at least one truss member of the structural frame. At block 1212, the process 1200 includes determining, using a processor of a FOSS and based on the detected light signal, a physical condition of the at least one truss member. At block 1214, the process 1200 includes, responsive to determining the physical condition at block 1212, performing a further action related to the determined physical condition.

Figure 13:
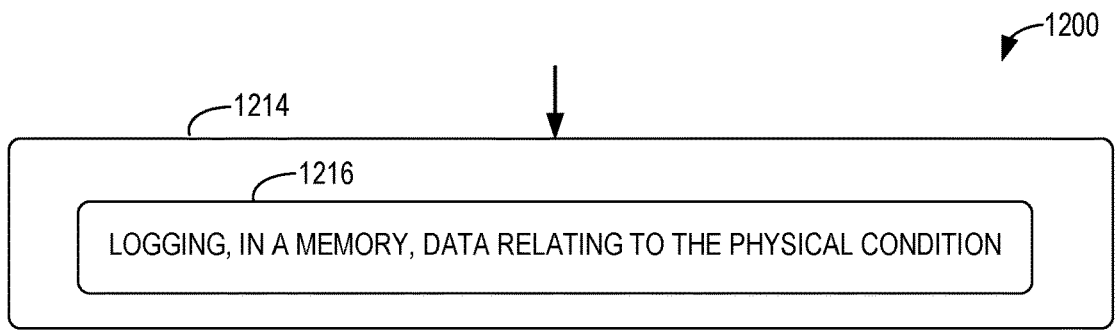
FIG. 13 illustrates a flow chart of an example process for monitoring a physical condition of a structural frame that can be used with the process shown in FIG. 12.
Figure 14:
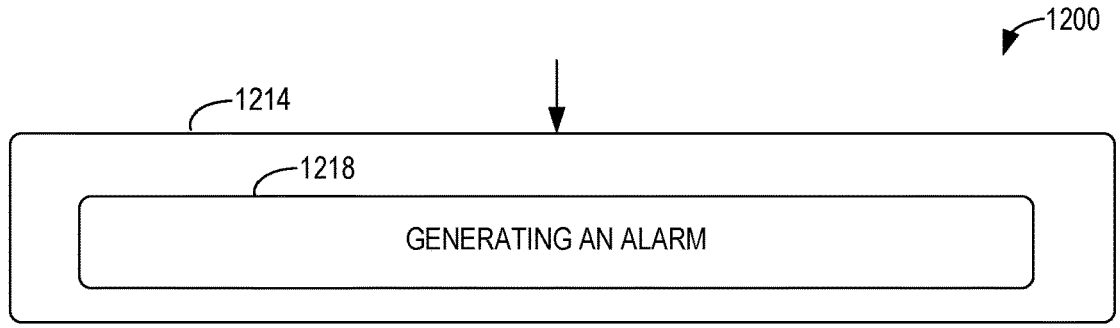
FIG. 14 illustrates a flow chart of an example process for monitoring a physical condition of a structural frame that can be used with the process shown in FIG. 12.

FIGS. 13-16 depict additional aspects of the process 1200 according to further examples. As shown in FIG. 13, performing the further action at block 1214 can include logging, in a memory, data relating to the physical condition at block 1216. As shown in FIG. 14, performing the further action at block 1214 can include generating an alarm at block 1218.

Figure 15:
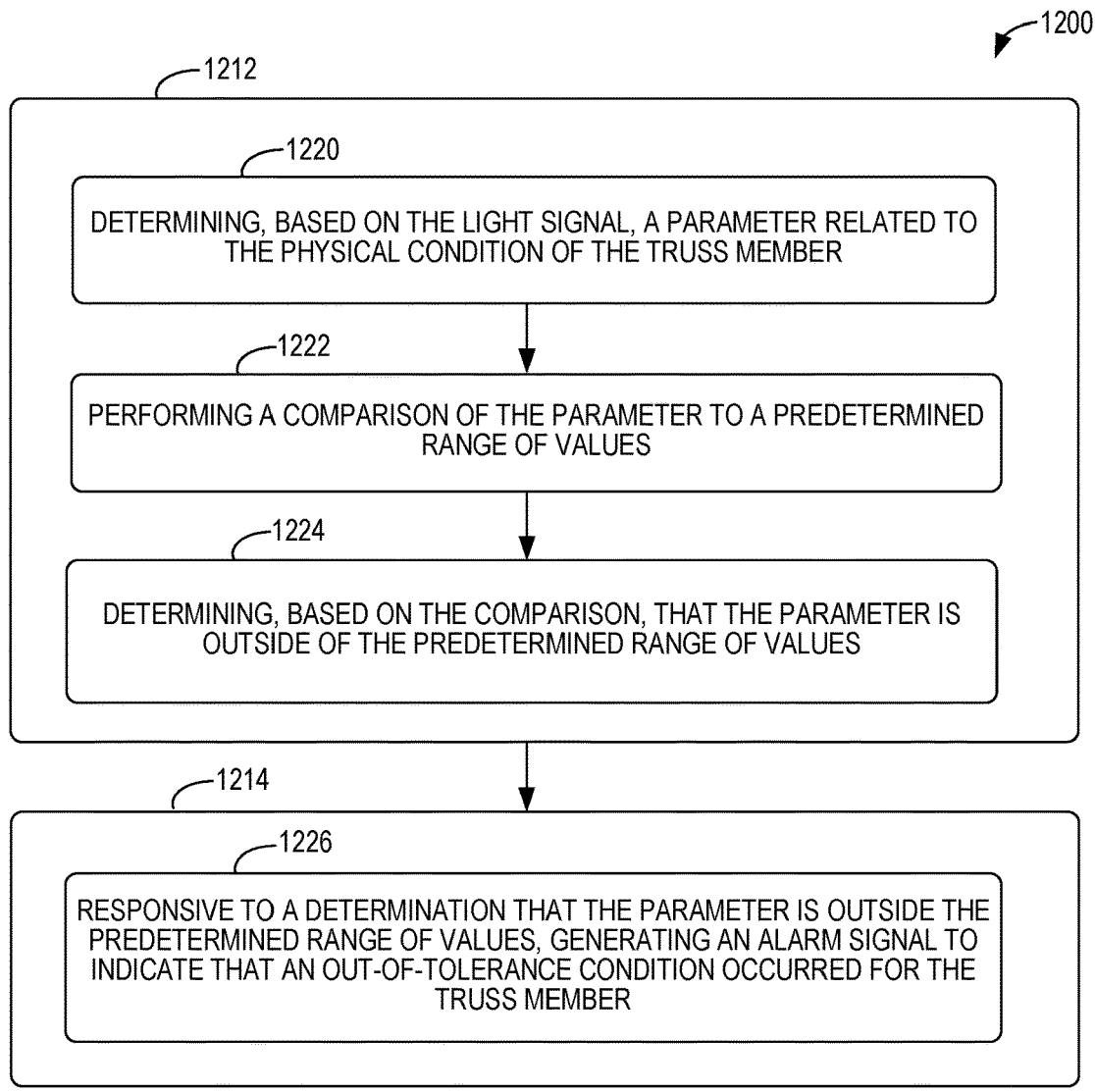
FIG. 15 illustrates a flow chart of an example process for monitoring a physical condition of a structural frame that can be used with the process shown in FIG. 12.

As shown in FIG. 15, determining the physical condition at block 1212 can include: (i) determining, based on the light signal, a parameter related to the physical condition of the truss member at block 1220, (ii) performing a comparison of the parameter to a predetermined range of values at block 1222, and (iii) determining, based on the comparison, that the parameter is outside of the predetermined range of values at block 1224. As also shown in FIG. 15, performing the further action at block 1214 can include, responsive to a determination that the parameter is outside the predetermined range of values at block 1224, generating an alarm signal to indicate that an out-of-tolerance condition occurred for the truss member at block 1226.

Figure 16:
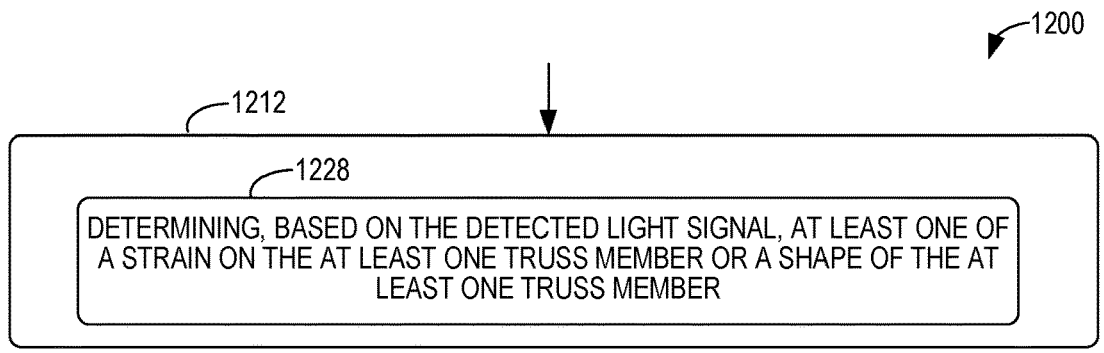
FIG. 16 illustrates a flow chart of an example process for monitoring a physical condition of a structural frame that can be used with the process shown in FIG. 12.

As shown in FIG. 16, determining the physical condition at block 1212 can include determining, based on the detected light signal, at least one of a strain on the at least one truss member or a shape of the at least one truss member at block 1228.

One or more of the blocks shown in FIGS. 12-16 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A structural frame, comprising:
a hub comprising a plurality of hub slots around a perimeter of the hub; and
a plurality of truss members configured to couple with the hub and each other, wherein each truss member is a monolithic structure comprising:
a body extending from a first end of the truss member to a second end of the truss member,
a truss fastener at the first end and configured to couple with a respective one of the plurality of the hub slots of the hub,
a truss slot at the second end and configured to couple to the truss fastener of another one of the plurality of truss members, and
one or more retainers extending along the body between the first end and the second end,
wherein, for each truss member, the one or more retainers comprises a plurality of conduits extending through the body of the truss member from the first end to the second end.

2. The structural frame of claim 1, wherein each truss member has a cross-sectional shape comprising at least three corners, and
wherein, for each truss member, a respective one of the plurality of conduits is at each corner of the truss member.

3. The structural frame of claim 1, wherein, for at least one truss member of the plurality of truss members, the one or more retainers further comprise a groove extending along an exterior of the body of the at least one truss member from the first end to the second end, and
wherein each groove is configured to retain an elongated structure by a press-fit coupling between the groove and the elongated structure.

4. The structural frame of claim 3, wherein the elongated structure comprises least one of an optical fiber, a hydraulic fluid line, a mass-flow line, a feed-stock line, a fuel line, a cable, or a heat exchanger tube.

5. The structural frame of claim 1, wherein, for each truss member, the body of the truss member comprises:
a plurality of longitudinal portions extending from the first end to the second end; and
a plurality of transverse portions extending between the plurality of longitudinal portions,
wherein the longitudinal portions and the transverse portions define a plurality of apertures in the body between the first end and the second end.

6. The structural frame of claim 1, wherein the hub is a hollow, monolithic structure comprising a cavity.

7. The structural frame of claim 1, wherein a first set of the plurality of truss members is coupled to the hub,
wherein each truss member of the first set is coupled to a respective hub slot of the plurality of hub slots by a bearing that is (i) in the respective hub slot and (ii) surrounding the truss fastener of the truss member, and
wherein each truss member of the first set is rotatable, about an axis of the truss fastener of the truss member, relative to the hub.

8. The structural frame of claim 1, further comprising a plurality of retaining rings,
wherein each retaining ring has an outer circumference that is greater than a circumference of each hub slot,
wherein a first set of the plurality of truss members is coupled to the hub by the plurality of retaining rings, and
wherein, for each truss member of the first set:
(i) the truss fastener extends, from a first side of the hub to a second side of the hub, through a respective hub slot of the plurality of hub slots,
(ii) the truss fastener comprises a notch on the second side of the hub, and
(iii) a respective retaining ring of the plurality of retaining rings is coupled to the notch of the truss fastener on the second side of the hub such that the respective retaining ring inhibits withdrawal of the truss fastener from the respective hub slot.

9. The structural frame of claim 1, wherein the hub further comprises a hub fastener configured to couple the hub to at least one of a bulkhead, a strong-back, a rib, a spar, a landing gear assembly, a step-ladder, or a storage bin on an aircraft.

10. A structural frame, comprising:
a hub comprising a plurality of hub slots around a perimeter of the hub; and
a plurality of truss members coupled to the hub, wherein each truss member is a monolithic structure comprising:
a body extending from a first end of the truss member to a second end of the truss member,
a truss fastener at the first end and coupled with a respective one of the plurality of the hub slots of the hub, and
one or more retainers extending along the body between the first end and the second end,
wherein, for each truss member, the one or more retainers comprises a plurality of conduits extending through the body of the truss member from the first end to the second end; and
a plurality of optical fibers coupled to the one or more retainers of the plurality of truss members.

11. The structural frame of claim 10, wherein the plurality of optical fibers comprise a plurality of bundles of optical fibers, and
wherein each bundle of optical fibers is coupled to a respective one of the one or more retainers.

12. The structural frame of claim 11,
wherein each conduit contains a respective one of the plurality of bundles of optical fibers.

13. The structural frame of claim 11, wherein, for at least one truss member of the plurality of truss members, the one or more retainers further comprise a groove extending along an exterior of the body of the truss member from the first end to the second end, and
wherein each groove is configured to retain a respective one of the plurality of bundles of optical fibers by a press-fit coupling.

14. The structural frame of claim 10, further comprising a fiber optic sensing system (FOSS) comprising:
a light source configured to transmit light along the plurality of optical fibers, wherein the plurality of optical fibers are configured to reflect the light transmitted by the light source,
a light sensor configured to sense the light reflected by the plurality of optical fibers, and
a processor in communication with the light sensor and configured to determine, based on the light sensed by the light sensor, a physical condition of at least one truss member of the plurality of truss members.

15. The structural frame of claim 14, wherein, for each truss member, the physical condition determined by the processor is at least one of a strain on the truss member or a shape of the truss member.

16. The structural frame of claim 14, wherein the processor is configured to, for each truss member:

determine, based on the light sensed by the light sensor, a parameter related to the physical condition of the truss member, perform a comparison of the parameter to a predetermined range of values;

determine, based on the comparison, that the parameter is outside of the predetermined range of values; and responsive to a determination that the parameter is outside the predetermined range of values, generate an alarm signal to indicate that an out-of-tolerance condition occurred for the truss member.

17. A structural frame, comprising:

a hub comprising a plurality of hub slots around a perimeter of the hub;

a first truss member comprising:

a first body extending from a first end of the first truss member to a second end of the first truss member, a truss fastener at the first end of the first truss member and coupled to a hub slot of the plurality of hub slots, a truss slot at the second end of the first truss member, and a plurality of conduits extending through the first body between the first end and the second end of the first truss member;

a second truss member coupled to the first truss member, wherein the second truss member comprises:

a second body extending from a first end of the second truss member to a second end of the second truss member, a truss fastener at the first end of the second truss member and coupled to the truss slot of the first truss member, and a plurality of conduits extending through the second body between the first end and the second end of the second truss member;

an optical fiber coupled to a first conduit of the plurality of conduits of the first truss member and a second conduit of the plurality of conduits of the second truss member; and a fiber optic sensing system (FOSS) configured to sense light reflected in the optical fiber and determine, based on the light, a physical condition of the first truss member and the second truss member, wherein the first truss member is a monolithic structure, and wherein the second truss member is a monolithic structure.

18. The structural frame of claim 17, further comprising a bracket configured to couple the first truss member to a bulkhead of an aircraft.

19. The structural frame of claim 18, wherein the first truss member comprises the bracket such that the bracket is a part of the monolithic structure of the first truss member.

20. The structural frame of claim 17, wherein the first conduit is axially aligned with the second conduit.

21. The structural frame of claim 1, each conduit is configured to contain an elongated structure extending through the conduit, and wherein the elongated structure comprises least one of an optical fiber, a hydraulic fluid line, a mass-flow line, a feed-stock line, a fuel line, a cable, or a heat exchanger tube.

* * * * *